(12) United States Patent
Ikeda

(10) Patent No.: US 10,904,439 B2
(45) Date of Patent: Jan. 26, 2021

(54) IMAGE PICKUP APPARATUS, LENS UNIT, IMAGE PICKUP SYSTEM, AND CONTROL METHOD FOR IMAGE PICKUP SYSTEM

(71) Applicant: CANON KABUSHIKI KAISHA, Tokyo (JP)

(72) Inventor: Shunichiro Ikeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 26 days.

(21) Appl. No.: 15/429,657

(22) Filed: Feb. 10, 2017

(65) Prior Publication Data
US 2017/0251147 A1 Aug. 31, 2017

(30) Foreign Application Priority Data
Feb. 26, 2016 (JP) .................................. 2016-035020

(51) Int. Cl.
*H04N 5/235* (2006.01)
*H04N 5/232* (2006.01)
*H04N 5/225* (2006.01)

(52) U.S. Cl.
CPC ....... *H04N 5/23287* (2013.01); *H04N 5/2254* (2013.01); *H04N 5/2358* (2013.01);
(Continued)

(58) Field of Classification Search
CPC ............. H04N 5/23287; H04N 5/2254; H04N 5/23203; H04N 5/23209; H04N 5/23245;
(Continued)

(56) References Cited

U.S. PATENT DOCUMENTS 9,185,297 B2    11/2015  Yamazaki
9,749,556 B2 *  8/2017   Fettig .................. H04N 5/2355
(Continued)

FOREIGN PATENT DOCUMENTS

CN    1892294 A      1/2007
JP    2011-186487 A  9/2011
(Continued)

OTHER PUBLICATIONS

The above foreign patent documents were cited in a Sep. 29, 2019 Chinese Office Action, a copy of which is enclosed with an English Translation, that issued in Chinese Patent Application No. 201710111846.6.

*Primary Examiner* — Xi Wang
(74) *Attorney, Agent, or Firm* — Cowan, Liebowitz & Latman, P.C.

(57) ABSTRACT

An image pickup system includes a camera body and a lens unit that is attachable to the camera body. The lens unit detects shaking by a shake detection unit. Drive control of an image shake correction unit is performed in accordance with an image shake correction amount calculated based on the shaking. The camera body sets timing of obtaining the shaking detected by the shake detection unit, based on information transmitted to the lens unit. In a first communication, a camera communication control unit transmits information on a base point to a lens communication control unit, and in a second communication, the camera communication control unit transmits information on a relative time from the base point that was transmitted in the first communication to a lens communication control unit.

32 Claims, 14 Drawing Sheets

(52) U.S. Cl.
CPC ..... *H04N 5/23203* (2013.01); *H04N 5/23209* (2013.01); *H04N 5/23245* (2013.01); *H04N 5/23251* (2013.01); *H04N 5/23258* (2013.01)

(58) Field of Classification Search
CPC ............. H04N 5/23251; H04N 5/2358; H04N 5/23248–2329; G02B 27/646; G03B 2205/00007–0038
USPC ........................ 359/554–557; 396/52–55, 13; 348/208.99, 219.1
See application file for complete search history.

(56) References Cited

U.S. PATENT DOCUMENTS

| | | | |
|---|---|---|---|
| 2008/0074535 A1* | 3/2008 | Ohsuga | H04N 5/232 348/371 |
| 2008/0199170 A1* | 8/2008 | Shibuno | G02B 7/102 396/125 |
| 2009/0245777 A1* | 10/2009 | Shibuno | G03B 13/36 396/104 |
| 2010/0026821 A1* | 2/2010 | Sato | G03B 5/00 348/208.99 |
| 2011/0091194 A1* | 4/2011 | Isaka | G02B 7/08 396/133 |
| 2014/0049658 A1* | 2/2014 | Yamazaki | H04N 5/23267 348/208.11 |
| 2016/0366324 A1* | 12/2016 | Nakata | H04N 5/2352 |
| 2017/0013199 A1* | 1/2017 | Kunugi | G02B 27/646 |
| 2017/0019600 A1* | 1/2017 | Koyano | H04N 5/23287 |
| 2017/0068108 A1* | 3/2017 | Kim | G02B 13/002 |

FOREIGN PATENT DOCUMENTS

| | | |
|---|---|---|
| JP | 2014-039131 A | 2/2014 |
| JP | 2015-161730 A | 9/2015 |

* cited by examiner

IMAGE PICKUP APPARATUS, LENS UNIT, IMAGE PICKUP SYSTEM, AND CONTROL METHOD FOR IMAGE PICKUP SYSTEM

BACKGROUND OF THE INVENTION

Field of the Invention

The present invention relates to an image pickup apparatus, a lens unit, an image pickup system, and a control method for the image pickup system.

Description of the Related Art

There is a technique that detects hand shaking and the like applied to an image pickup apparatus and corrects an image shake caused by the shaking. Image shake correction, which is a method that moves an image shake correction lens in accordance with the detected shaking, is referred to as "optical image shake correction" or "optical anti-shake". Additionally, image shake correction that corrects the shaking of an image that has been shot during the shot of the moving images by cutting out and outputting a part of the shot image in accordance with the detected shaking is referred to as "electronic image shake correction" or "electronic anti-shake". In recent years, a technique that enhances the image shake correction effect on a large image shake caused by walking shots or the like by widening an image shake correction range, in particular, on a wide side (wide angle side) during the shot of the moving images is known. The use of both the optical image shake correction and the electronic image shake correction enables obtaining a greater correction effect and enables responding to a larger image shake as well.

In contrast, in an interchangeable lens camera system, a configuration is contemplated in which a lens unit attached to a camera body includes an optical image shake correction mechanism, and the camera body includes an optical image shake correction unit or an electronic image shake correction unit. That is, it is a system in which the lens unit and the camera body are combined so that each one independently perform shake correction. A technique is disclosed in which, in such a system, the lens unit and the camera body control the shake correction via each communicating in cooperation each other, rather than independently controlling the shake correction, and thereby the correction effect is enhanced. Japanese Patent Application Laid-Open No. 2014-39131 discloses a technique in which the camera body transmits exposure time (shutter speed) information to a lens unit, and the detection timings of the image shake correction means for a plurality of times is determined based on the shutter speed information. Additionally, Japanese Patent Application Laid-open No. 2015-161730 discloses a technique in which a moving amount of an object image on a captured surface is matched with output timing from the shake detection means and the detection accuracy of an angular velocity of the object is consequently enhanced.

In order for the lens unit and the camera body to perform the image shake correction via each communicating in cooperation with each other, the camera body needs to transmit an exposure center timing of the pickup image to the lens unit. Additionally, a case in which the camera body tries to transmit the exposure center timing to the lens unit communicating one time may cause variations in communication time due to overlapping with another communication, and as a result, accurate exposure center timing may not be communicated.

Although Japanese Patent Application Laid-open No. 2014-39131 discloses that the shutter speed information is transmitted at the same time as the vertical synchronization timing, it does not disclose the details thereof, and does not refer to communication deviation. Additionally, Japanese Patent Application Laid-open No. 2015-161730 discloses setting the timing for obtaining data by using the information on the exposure time and the frame rate, but it does not disclose the details thereof, and does not refer to the communication deviation.

SUMMARY OF THE INVENTION

The present invention performs image correction by avoiding communication timing deviation due to overlapping of the communications in an image pickup system including a lens unit and a body of an image pickup apparatus that communicate with each other.

The present invention is an image pickup apparatus that performs communication with a lens unit, including a first communication unit, a correction unit that corrects image shake in an image due to shaking, and a control unit that obtains a shake detection signal and controls the correction unit comprising: an image pickup unit; a second communication unit that is configured to communicate with the lens unit; and a setting unit that is configured to set timing by which the control unit obtains the shake detection signal based on information transmitted to the lens unit, wherein, in a first communication, the second communication unit transmits information on a base point, which serves as information in which the setting unit sets the timing, to the first communication unit, and wherein, in a second communication, the second communication unit transmits information on the relative time from the base point, to the first communication unit.

Further features of the present invention will become apparent from the following description of exemplary embodiments with reference to the attached drawings.

DESCRIPTION OF THE EMBODIMENTS

Figure 1:
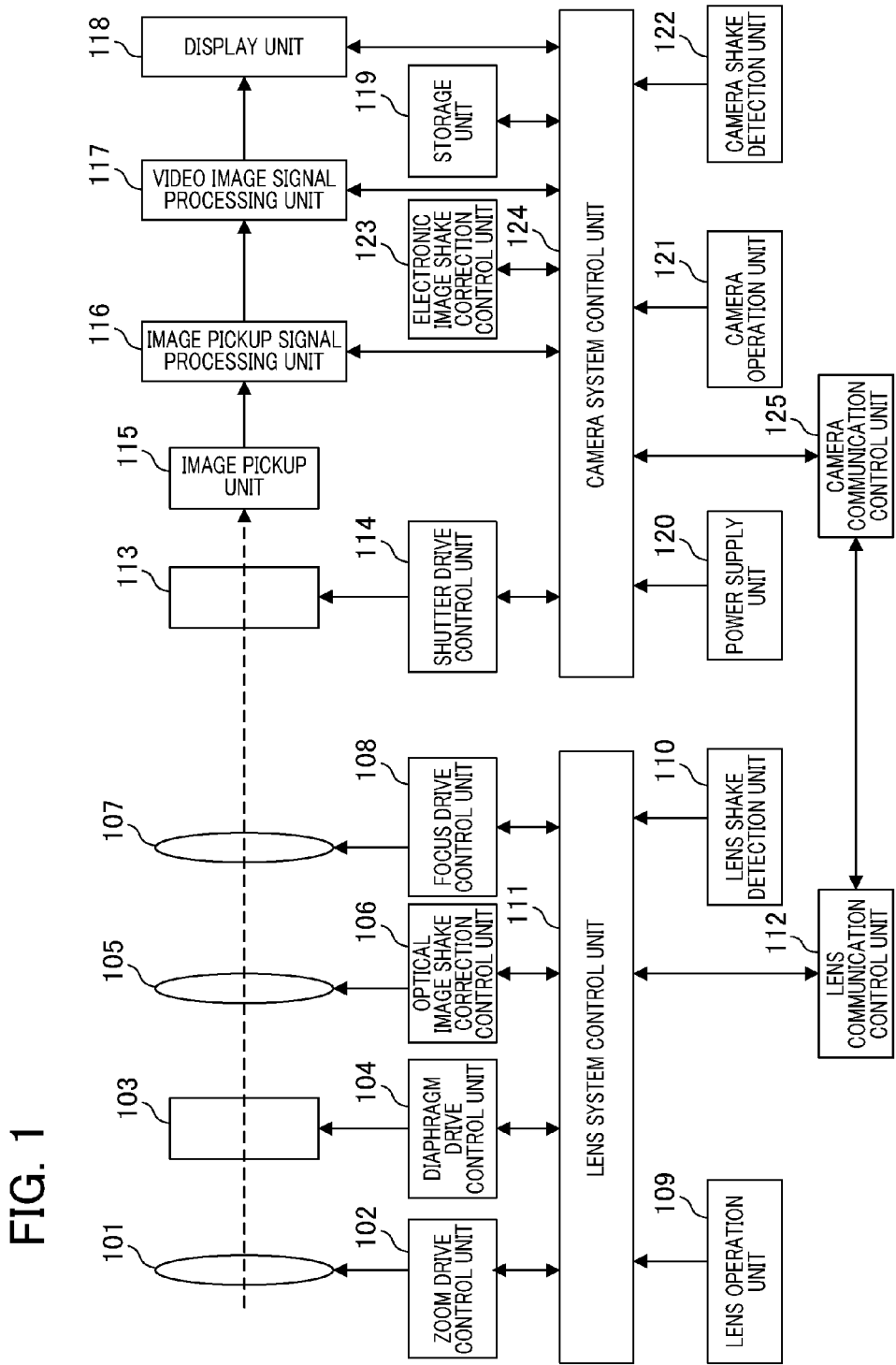
FIG. 1 is a block diagram illustrating a configuration example of an image pickup system according to an embodiment of the present invention.

Hereinafter, a description will be given of each embodiment of the present invention in detail with reference to the accompanying drawings. First, a description will be given of matters common to each embodiment. FIG. 1 is a block diagram illustrating a configuration of an image pickup system according to an embodiment of the present invention. The image pickup system is an interchangeable lens digital camera mainly for performing shooting of still images and moving images. The application range of the present invention is not limited to digital cameras, and the present invention can be applied to various image pickup systems.

The image pickup system shown in FIG. 1 is configured by a lens unit and a camera body, and the lens unit is used by being mounted on the camera body. A zoom unit 101 of the lens unit includes a zoom lens that changes the magnification. A zoom drive control unit 102 drives and controls the zoom unit 101. A diaphragm unit 103 has a diaphragm function. A diaphragm drive control unit 104 drives and controls the diaphragm unit 103. An image shake correction unit 105 includes an image shake correction lens such as a shift lens (hereinafter, also referred to as a "correction lens"). The image shake correction unit 105 is a first image shake correction unit, and an optical image shake correction control unit 106 performs a drive control. A focus unit 107 includes a focus lens that forms an object image by performing focus adjustment. A focus drive control unit 108 drives and controls the focus unit 107.

A lens operation unit 109 is an operation unit used for the operation of the lens unit by a user. A lens shake detection unit 110 detects a shake amount applied to the lens unit and outputs a detection signal to a lens system control unit 111. The lens system control unit (hereinafter, referred to as a "lens control unit") 111 that controls the entire lens unit includes a CPU (Central Processing Unit), and integrally controls each of the drive control units and the correction control unit of the lens unit. The lens system control unit 111 communicates with a control unit of the camera body via a lens communication control unit 112.

Next, a description will be given of the camera body. The camera body includes a shutter unit 113. A shutter drive control unit 114 drives and controls the shutter unit 113. An image pickup unit 115 includes an image pickup element, photoelectrically converts an optical image formed passing through each lens group, and outputs an electric signal. An image pickup signal processing unit 116 converts the electric signal that has been output from the image pickup unit 115 into a video image signal. A video image signal processing unit 117 processes the video image signal that has been output from the image pickup signal processing unit 116 depending on the use. For example, the video image signal processing unit 117 changes an extraction position of the video image signal in accordance with a correction amount of an electronic image shake correction control unit 123. The electronic image shake correction control unit 123 is a second image shake correction unit and performs control of image shake correction by the extraction of an image. Note that the second image shake correction is not limited to the electronic image shake correction, and it includes, for example, image shake correction by a drive control of the image pickup element and image shake correction by a drive control of a movable optical element inside of the camera body.

A display unit 118 displays an image as necessary, based on the signal that has been output from the video image signal processing unit 117. A storage unit 119 stores various data such as video image information. A power supply unit 120 supplies a power source to the entire system in accordance with the use. A camera operation unit 121 is an operation unit used for the operation of the camera system by the user and outputs an operation signal to a camera system control unit 124. A camera shake detection unit 122 detects a shake amount applied to the camera and outputs a detection signal to the camera system control unit 124. The camera system control unit (hereinafter, referred to as a "camera control unit") 124 has a CPU and integrally controls the entire camera system. The camera system control unit 124 communicates with the lens communication control unit 112 of the lens unit via a camera communication control unit 125. That is, in a state in which the lens unit is mounted on the camera body and is electrically connected thereto, mutual communication is performed by using the lens communication control unit 112 and the camera communication control unit 125.

Next, a description will be given of a schematic operation of the image pickup system having the above configuration. The lens operation unit 109 and/or the camera operation unit 121 include an image shake correction switch that can select ON/OFF of image shake correction. If the user operates the image shake correction switch and selects the image shake correction to be ON, the lens system control unit 111 or the camera system control unit 124 provides an instruction to the optical image shake correction control unit 106 or the electronic image shake correction control unit 123 to perform image shake correction operation. Each image shake control unit controls image shake correction until an instruction to turn off the image shake correction is provided.

Additionally, the camera operation unit 121 includes an image shake correction mode switch that can select a first mode or a second mode with respect to image shake correction. The first mode is a mode that performs image shake correction only by using the optical image shake correction (first image shake correction). The second mode is a mode that performs image shake correction by using both the optical image shake correction and the electronic image shake correction (second image shake correction). If the first mode was selected, the read-out position of the image pickup unit 115 is fixed, and it is compatible wider angle shooting by expanding the read-out range by that amount. Additionally, if the second mode was selected, the extraction position changes in accordance with the image shake correction amount instead of narrowing the extraction range of the video image signal by the video image signal processing unit 117, and as a result, it is possible to respond to a larger image shake.

The camera operation unit 121 includes a shutter release button configured so that a first switch (SW1) and a second switch (SW2) are sequentially turned on in accordance with the push amount. If the user presses the shutter release button approximately halfway, the first switch SW1 is ON, and if the shutter release button is pushed all the way down, the second switch SW2 is ON. If the SW1 is ON, the focus drive control unit 108 drives the focus unit 107 and performs focus adjustment, and the diaphragm drive control unit 104 drives the diaphragm unit 103 and sets it to an appropriate exposure amount. If the SW2 is ON, the image data obtained from the light image exposed to the image pickup unit 115 is stored in the storage unit 119.

Additionally, the camera operation unit 121 includes a moving image recording switch. The camera starts shooting a moving image after pressing down the moving image recording switch, and if the user presses the moving image recording switch again during the recording, the recording ends. If the user operates the shutter release button during the shooting of the moving image and the SW1 and the SW2 are ON, a process that obtains and records a still image during the recording of the moving image is executed. Additionally, the camera operation unit 121 includes a reproducing mode selection switch that can select a reproduction mode. If the reproducing mode was selected by the operation of the reproducing mode selection switch, the camera stops an anti-shake (image shake correction) operation.

Figure 2:
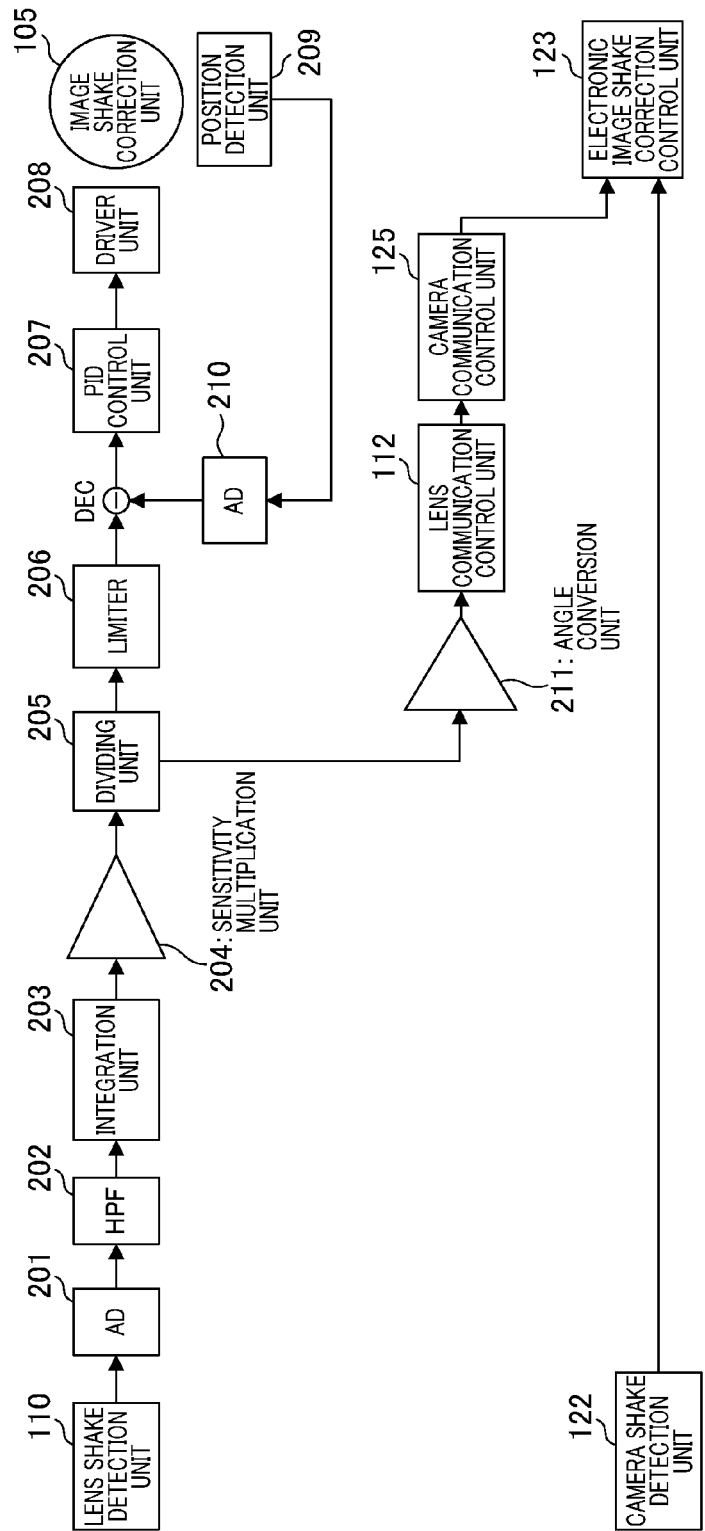
FIG. 2 is a block diagram of a part relating to control of image shake correction.
Figure 16:
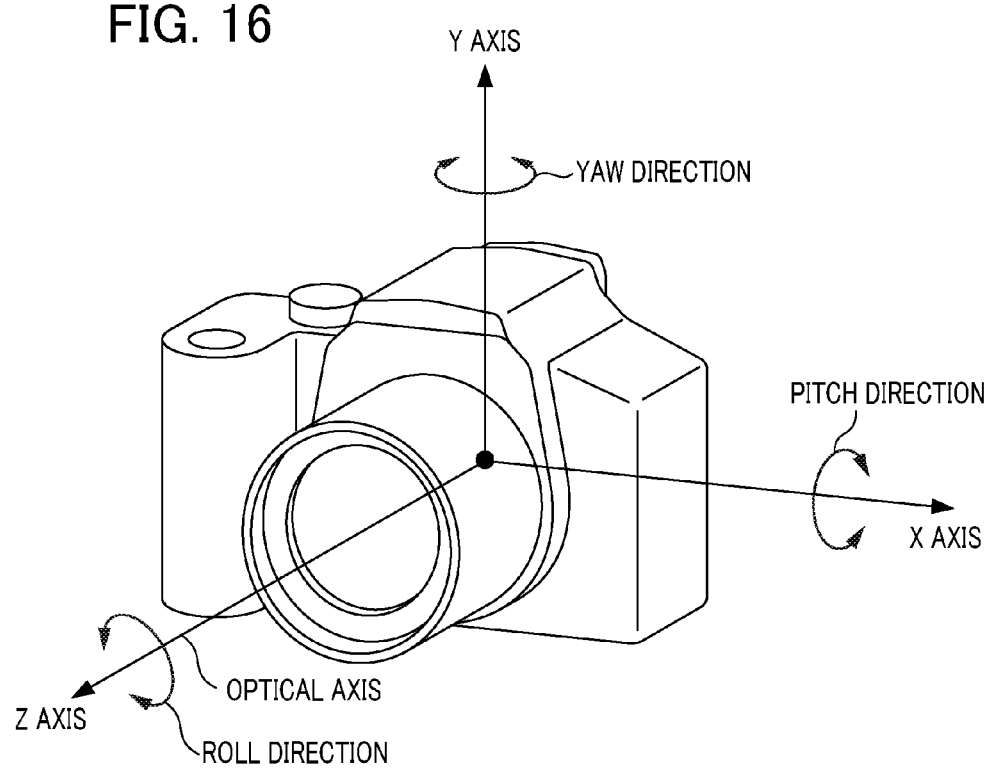
FIG. 16 is an illustration diagram of the pitch direction, the yaw direction, and the roll direction in the image pickup apparatus.

A description will be given of image shake correction control in the image pickup system with reference to FIGS. 2 and 16. FIG. 2 is a block diagram illustrating a part relating to the image shake correction control in the entire image pickup system in more detail. FIG. 16 illustrates the pitch direction, the yaw direction, and the roll direction. The lens shake detection unit 110 and the camera shake detection unit 122 in FIG. 2 detect angular velocity data by using a gyro sensor serving as a shake detection sensor and output a detection voltage. The lens shake detection unit 110 has a pitch direction shake detection sensor and a yaw direction shake detection sensor. Additionally, the camera shake detection unit 122 has a roll direction shake detection sensor. As shown in FIG. 16, in the image pickup apparatus, the optical axis of the image pickup optical system is defined as the Z axis, the vertical direction at the normal position is defined as the Y axis, and the direction orthogonal to the Y axis and the Z axis is defined as the X axis. Accordingly, the pitch direction is a direction rotating around the X axis (tilting direction), the yaw direction is a direction rotating around the Y axis (panning direction), and the roll direction is a direction rotating around the Z axis (direction in which the image pickup surface rotates in a plane perpendicular to the optical axis). That is, the pitch direction is a tilting direction with respect to the horizontal plane in the perpendicular direction of the image pickup apparatus, and the yaw direction is a tilting direction with respect to the vertical plane in the horizontal direction of the image pickup system, and they are orthogonal to each other.

The pitch direction shake detection sensor detects shaking information in proportion to shaking in the pitch direction. The yaw direction shake detection sensor detects the shaking information in proportion to the shaking in the yaw direction. The roll direction shake detection sensor detects the shaking information in proportion to the shaking in the rotating direction in a plane perpendicular to the optical axis. Each of the pieces of shaking information is obtained as the angular velocity data. Note that because, in FIG. 2, the same configuration is provided for the pitch direction and the yaw direction, the configuration of only one axis will be described.

The lens shake detection unit 110 outputs the angular velocity data obtained by an angular velocity sensor such as a gyro sensor, which serves as a detection voltage. An angular velocity detection AD conversion unit 201 converts a detection signal that has been output from the lens shake detection unit 110 into digital data. A high-pass filter 202 removes an offset component and a temperature drift component of the angular velocity data and outputs the result to an integration unit 203. The integration unit 203 mainly integrates the angular velocity data by pseudo integration by a low pass filter and converts the result into angle data. A sensitivity multiplication unit 204 for the optical image shake correction converts the angle data obtained from the integration unit 203 into a drive control amount (shift amount) of the image shake correction lens. This sensitivity is changed every time the focal length of the image pickup optical system changes. Additionally, the correction amount due to the sensitivity adjustment of the angular velocity sensor is also reflected in the sensitivity, and dispersion in sensitivity is absorbed.

A dividing unit 205 divides an image shake correction output amount from the sensitivity multiplication unit 204 into two. The image shake correction amount is divided into an optical image shake correction amount that is applied to the optical shake correction and an electronic image shake correction amount that is applied to the electronic shake correction. In order to calculate the optical image shake correction amount, the dividing unit 205 multiplies the image shake correction amount by a coefficient (referred to as "K"). The coefficient K is determined by the movable range of the optical image shake correction (referred to as "A") and the movable range of the electronic image shake correction (referred to as "B") in each focal length, as shown in the following formula (1). The movable range is a range in which the control of the image shake correction is allowed, and corresponds to a range within which the drive control of the image shake correction unit 105 is allowed in the case of the optical image shake correction. Additionally, in the case of the electronic image shake correction, the movable range corresponds to a range in which the correction process by the extraction of the image is allowed.

$$K=A/(A+B) \qquad (1)$$

Based on the formula (1), K takes a value of 1 or less. That is, by multiplying using the coefficient K, a correction amount of the optical image shake correction to the total amount of the image shake correction amount (first image shake correction amount) is calculated.

A limiter 206 of the optical image shake correction amount clamps the first image shake correction amount in the movable range of the image shake correction unit 105. By doing this, it is possible to prevent a situation in which the correction lens is reaches and remains at the movable range end (the limit position of the drive control range) of the optical image shake correction. The output of the limiter 206 is input to a subtraction unit DEC.

A PID control unit 207 performs a position control of the image shake correction lens in response to an input from the subtraction unit DEC. The position control is performed by a combination of P (proportional) control, I (integral) control, and D (differential) control. A driver unit 208 supplies a current for driving the image shake correction unit 105 in accordance with the control signal of the PID control unit 207 that corresponds to the first image shake correction amount. The image shake correction unit 105 includes an electromagnetic actuator and the movable unit including the image shake correction lens is driven. A position detection unit 209 detects the position of the image shake correction unit 105 and outputs the detected voltage. The AD conversion unit 210 converts an analog detection voltage output from the position detection unit 209 into digital data and outputs it to the subtraction unit DEC. The subtraction unit DEC calculates the difference (deviation) between each output of the limiter 206 and the AD conversion unit 210, and outputs it to the PID control unit 207. As a result, a feedback control is performed.

Figure 13:
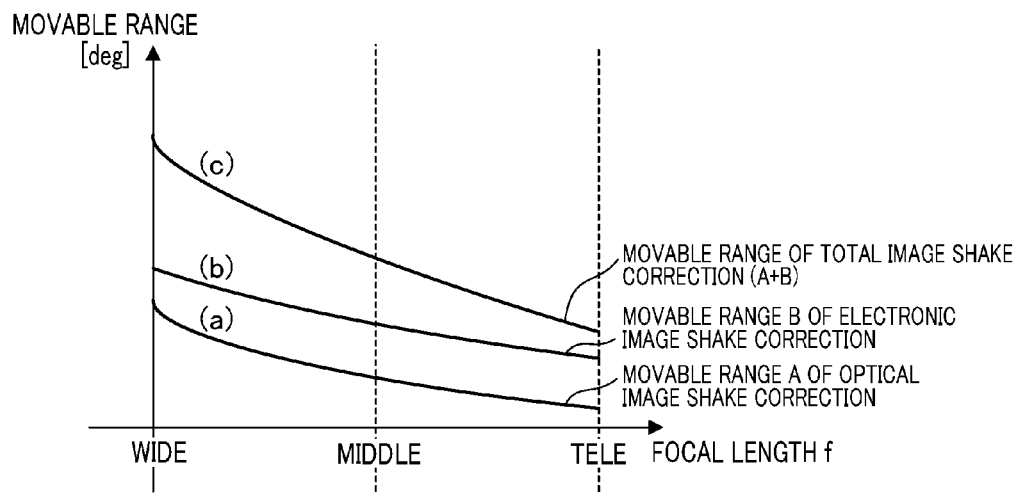
FIG. 13 is a graph illustrating the relation between a focal length and an image shake correction movable range.

In contrast, in order to calculate the electronic image shake correction amount, the dividing unit 205 multiplies the image shake correction amount output from the sensitivity multiplication unit 204 by a coefficient of "1−K". The image shake correction amount is divided by multiplying the optical image shake correction amount by the coefficient K, and multiplying the electronic image shake correction amount by the coefficient of "1−K". An angle conversion unit 211 converts the electronic image shake correction amount (second image shake correction amount) into the angle data. This conversion coefficient has different values for each focal length, and is changed each time the focal length changes. The data after conversion is transmitted to the electronic image shake correction control unit 123 via the lens communication control unit 112 and the camera communication control unit 125. The electronic image shake correction control unit 123 performs electronic image shake correction control in accordance with the second image shake correction amount and the electronic image shake correction amount based on the shake amount that has been obtained by the camera shake detection unit 122. With reference to FIG. 13, the movable range of the image shake correction will be specifically described.

FIG. 13 is a graph illustrating a relation between the focal length and a movable range of image shake correction of the camera. The horizontal axis represents a focal length f, which represents a wide (wide angle) end, a middle (intermediate) position, and a tele (telephoto) end. The vertical axis represents the movable range (unit: degrees). The graph lines of (a), (b), and (c) respectively represent the movable range A of the optical image shake correction, the movable range B of the electronic image shake correction, and the movable range of the entire image shake correction (A+B). That is, they satisfy the relation (a)+(b)=(c).

The movable range A of the optical image shake correction is determined by the optical characteristics of a shooting lens and the movable range B of the electronic image shake correction is determined by surplus pixels of the image pickup element. Note that in both the movable range A of the optical image shake correction and the movable range B of the electronic image shake correction, the correction angle changes depending on the zoom state. That is, even if the same shaking is applied to the camera, the image shake correction unit 105 for correcting the image shake has different drive amounts depending on the zoom position (optical zoom magnification, focal length). Even in a case where the same shaking of 1 degree is applied to the camera, the amount by which the shift lens of the image shake correction unit 105 moves at the wide end for correcting the image shake caused by this shaking of 1 degree is smaller than the amount by which the shift lens moves at the tele end. Both the movable range A of the optical image shake correction and the movable range B of the electronic image shake correction change depending on the focal length f and are managed as data on which angle conversion was performed in the image shake correction control.

Figure 14:
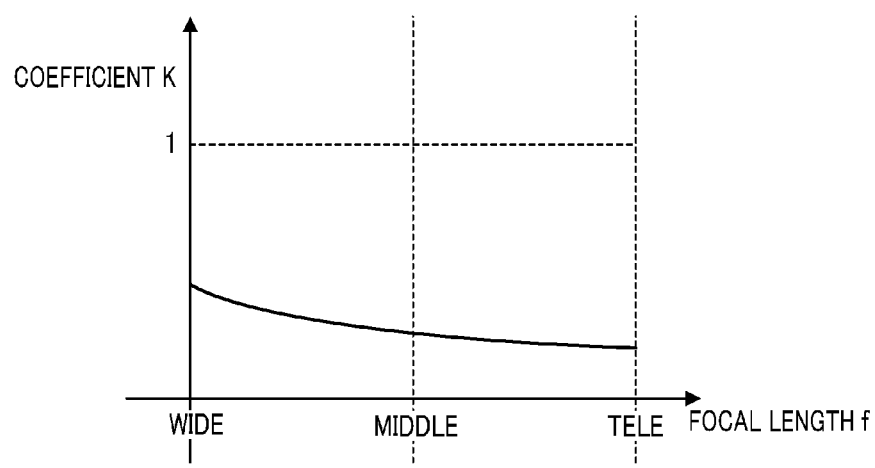
FIG. 14 is a graph illustrating the relation between the focal length and a division coefficient.

FIG. 14 is a graph illustrating a relation between the focal length and the coefficient K. In a state similar to FIG. 13, the horizontal axis represents the focal length f, and the vertical axis represents the coefficient K for dividing the image shake correction amount. The coefficient K is determined by the movable range A of the optical image shake correction and the movable range B of the electronic image shake correction. Additionally, because the optical image shake correction and the electronic image shake correction respectively operate, no boundary of the movable ends of the optical image shake correction and the electronic image shake correction exists. As a result, image distortion due to the overshooting of the optical image shake correction can be suppressed.

A description will be specifically given of the wide end, the middle position, and the tele end shown in FIG. 14. In the optical image shake correction, the image shake correction lens moves within the movable range A, and in the electronic image shake correction, the image processing is executed within the movable range B. The use of these corrections together helps to correct the image shake corresponding to the movable range of the entire image shake correction. As an example, the movable range A of the optical image shake correction is set to (2, 0.75, and 0.3) at the wide end, the middle position, and the tele end respectively. The movable range B of the electronic image shake correction is set to (2.5, 1.6, 1.1) at the wide end, the middle position, and the tele end respectively. The units of the movable ranges A and B are degrees. In this case, the value of the coefficient K is (0.444, 0.319, 0.214) at the wide end, the middle position, and the tele end respectively.

If the second mode that performs the optical image shake correction and the electronic image shake correction is set, the drive of the correction lens is performed by the image shake correction amount that is the result for the multiplication of K=A/(A+B), and the extraction position of the pickup image is changed by the image shake correction amount that is the result for the multiplication of coefficient "1−K". In contrast, if the first mode that performs only the optical image shake correction is set, the dividing unit 205 sets the value of the coefficient K to 1. That is, the drive control of the correction lens is performed with the total amount of the image shake correction amount serving as the optical image shake correction amount. Because the electronic image shake correction is not performed, the value of the coefficient of "1−K" relating to the electronic image shake correction amount is zero.

Next a description will be given of still image shooting in the second mode. If the second switch SW2 is turned ON by the operation of the shutter release button of the camera operation unit 121, the still image exposure operation is performed. The dividing unit 205 sets the value of the coefficient K to 1. The total amount of the image shake correction amount serves as the optical image shake correction amount. Because the electronic image shake correction is not performed during the exposure of still images, the value of the coefficient of "1−K" relating to the electronic image shake correction amount is zero. At the end of the still image exposure operation, the dividing unit 205 sets the coefficient of K=A/(A+B) in the optical image shake correction and sets the coefficient "1−K" by the electronic image shake correction. Note that at the start and end of the exposure operation of the still images, a process that provides a predetermined output time and gradually changes the correction output is performed in order to avoid sudden changes in the correction amount of the optical image shake correction and the correction amount of the electronic image shake correction.

Figure 3:
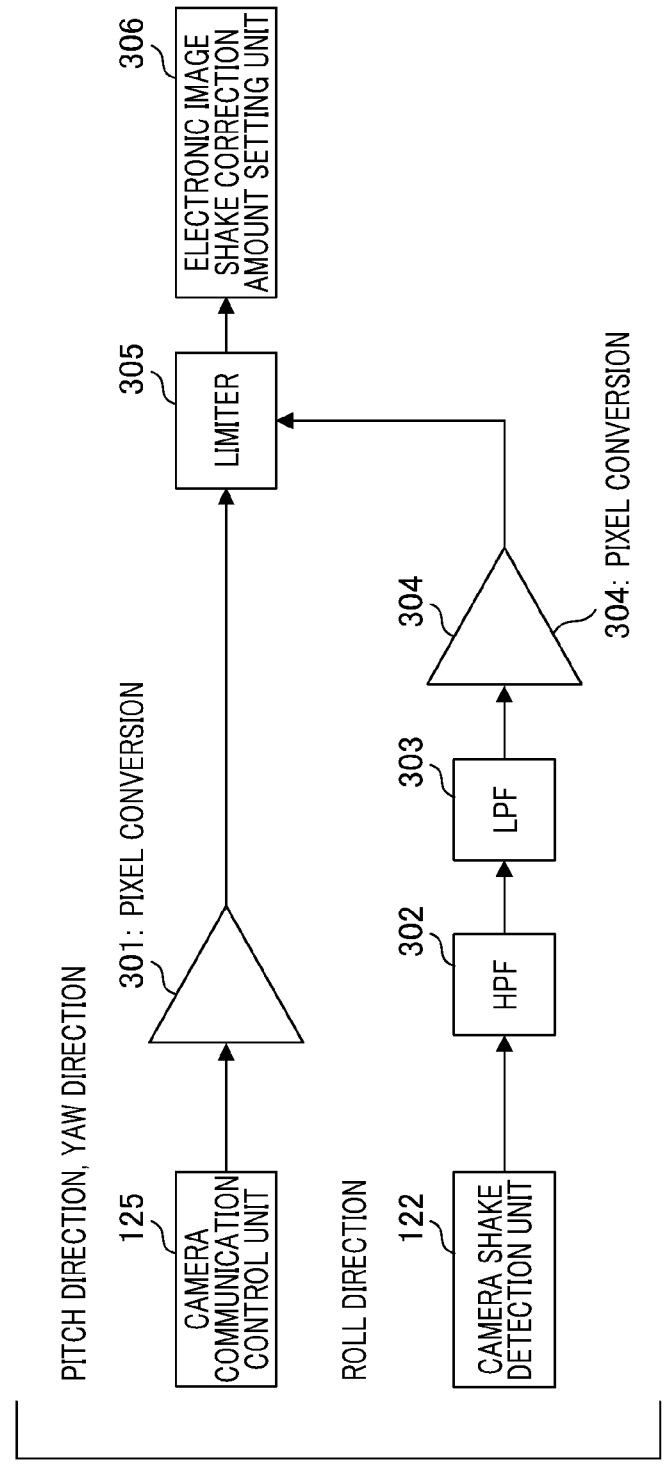
FIG. 3 is a block diagram illustrating a detail of an electronic image shake correction control unit.

FIG. 3 is a block diagram illustrating in detail the configuration of the electronic image shake correction control unit 123. The camera communication control unit 125 receives the electronic image shake correction amount from the lens unit via communication. The electronic image shake correction amount in the pitch direction and the yaw direction is transmitted to serve as a correction amount that has been converted into an angle. A pixel conversion unit 301 converts the electronic image shake correction amount into a pixel-converted correction amount (the number of pixels)

and outputs the result to a limiter 305. The conversion coefficient has different values for each focal length, and these are changed each time the focal length changes.

The camera shake detection unit 122 has the gyro sensor in the roll direction and outputs the detection signal to a high-pass filter 302. The high-pass filter 302 removes the offset and the drift component of the detection signal. Furthermore, a low-pass filter 303 cuts off the high frequency noise of the detection signal. Similar to the pixel conversion unit 301, a pixel conversion unit 304 converts the angle conversion data into a pixel-converted correction amount and outputs the result to the limiter 305.

The limiter 305 performs clamping in the extraction range of the electronic image shake correction. The limiter 305 performs a process on each output of the pixel conversion unit 301 and the pixel conversion unit 304. That is, each level of the limiter is set for each of the pitch direction, the yaw direction, and the roll direction. The correction amount after the limit processing is input to an electronic image shake correction amount setting unit 306. The electronic image shake correction amount setting unit 306 sets each of the electronic image shake correction amounts in each correction axis direction.

First Embodiment

A first embodiment of the present invention will be described below. A description will be given of the lens communication performed between the lens communication control unit 112 and the camera communication control unit 125 and the timing thereof, with reference to FIG. 4. In order to perform the optical image shake correction and the electronic image shake correction, it is necessary to transmit exposure center timing (406) of the image pickup unit 115 from the camera body to the lens unit. However, in addition to the image shake correction, much communication for AF (automatic focus adjustment), AE (automatic exposure), and the like is performed between the camera body and the lens unit. A case in which there is variation in the communication timing due to overlapping with another communication and the communication at the accurate exposure center timing is not possible may affect the process. Hence, in the present embodiment, in order to avoid the deviation of communication timing, the communication process is performed twice, that is, the camera body transmits the exposure center timing to the lens unit by separating the timing into a base point time and a relative time.

Additionally, when a large amount of information that is received and transferred by communication between the camera body and the lens, completing the process within the specified time becomes difficult. Furthermore, in order to be compatible with various interchangeable lenses, control without being conscious of individual lens specifications is necessary. Accordingly, in the present embodiment, the control is performed by the lens unit serving as a principal unit, and communication by angle conversion data for image shake correction is performed.

Figure 4:
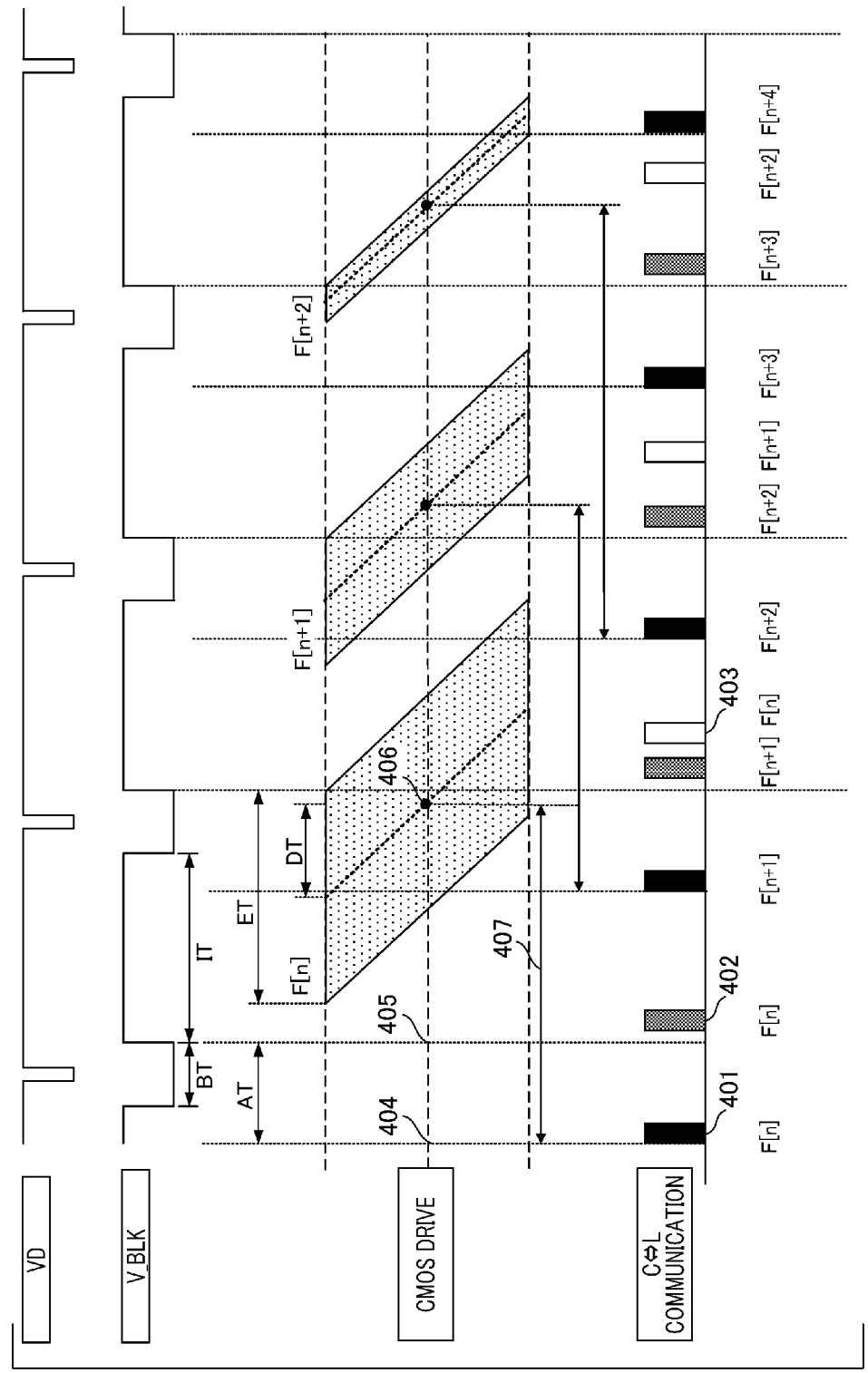
FIG. 4 illustrates a communication and a timing thereof in the first embodiment.

"VD" shown in FIG. 4 represents the timing of the vertical synchronization signal and "V_BLK" represents the timing of a vertical blanking period of time. "CMOS drive" represents a drive state of the image pickup element, and the lowermost line shows communication between the camera body (C) and the lens unit (L). This respectively represents a communication timing 404 of a first communication 401, timing 405 by which the exposure time is determined, and the exposure center timing 406. F [n] is an index representing the n-th frame. The each of the times shown in FIG. 4 is as follows.

BT: the length of vertical blanking period of time
IT: image time
AT: time from the first communication timing 404 to the timing 405
ET: exposure time
DT: delay time from the midpoint in the exposure period of time to the exposure center timing 406

The exposure center timing 406, which uses the timing 405 as a reference, is calculated by "IT+BT−ET/2+DT" based on the center of the exposure period of time. Note that, in each frame, the center of gravity of the parallelogram corresponds to the exposure center timing 406, and the area of the parallelogram becomes smaller as the exposure amount decreases. The read-out of the signals of the image pickup element starts at the point in time that the exposure time ET has elapsed (the upper right apex of the parallelogram) from the exposure start point (the upper left apex of the parallelogram).

The first communication 401 from the camera body to the lens unit is performed with the vertical synchronization signal of the image pickup portion 115 serving as a starting point. The first communication 401 serves as a reference for transmitting the exposure center timing 406 from the camera body to the lens unit. At the timing of receiving the information by the first communication 401, the lens unit obtains timer time in the lens unit, and sets the time as the base point for calculating the exposure center timing. Note that with respect to the communication timing 404 of the first communication 401, communication may be performed at the same timing as the vertical synchronization signal, or communication may be performed before or after any time from the vertical synchronization signal. However, communication is performed with a fixed time difference with respect to the vertical synchronization signal and each frame. Additionally, the first communication timing 404 is a timing that does not overlap with another communication. In the example shown in FIG. 4, the first communication timing 404 is set at a timing earlier (the past) than the vertical synchronization signal.

Next, a second communication 402 is performed from the camera body to the lens unit. In the second communication 402, the information on a relative time 407 from the first communication timing 404, which serves the first communication 401 as a reference, is transmitted to the lens unit. Additionally, in the second communication 402, the movable range B of the electronic image shake correction at the current focal length is transmitted. The communication timing of the second communication 402 is after the timing 405 by which the exposure time of the corresponding frame that transmits the exposure center is determined. Thus, even if the exposure time varies in each frame, an accurate exposure center timing 406 can be transmitted to the lens unit. The exposure center timing 406 is determined based on the determined exposure time and the signal read-out time of the image pickup element, and the relative time 407 is determined based on the difference that serves the communication timing 404 of the first communication 401 as a reference. That is, the relative time 407 is calculated by "AT+IT+BT−ET/2+DT". Note that the timing 405 by which the exposure time in each frame is determined is not necessarily fixed.

The lens unit receives the information on the relative time 407 in the second communication 402, which serves the reception timing of the first communication 401 as a reference. Accordingly, the exposure center timing 406 can be grasped by the timer setting in the lens unit. Additionally, the lens unit receives the movable range B of the electronic image shake correction by the second communication 402, and the coefficient K used for the dividing unit 205 can be calculated by including the movable range A of the optical image shake correction of the lens unit itself. In the lens unit, at the exposure center timing 406, the lens shake detection unit 110 detects the shaking information, and the dividing unit 205 further distributes the total amount of the image shake correction amount to the optical image shake correction amount in the lens unit and the electronic image shake correction amount in the camera body. The lens system control unit 111 holds the electronic image shake correction amount that has been distributed in the memory until a communication request is provided from the camera system control unit 124.

Additionally, a third communication 403 is performed from the camera body to the lens unit. In the third communication 403, after receiving the communication request from the camera system control unit 124, the lens system control unit 111 transfers the electronic image shake correction amount that was distributed to the camera system control unit 124. The communication timing of the third communication 403 is after the exposure center timing 406. Originally, the camera system control unit 124 grasps the exposure center timing 406, and thus, the communication is performed at any timing after the exposure center timing. In the camera body, the electronic image shake correction amount that was received from the lens system control unit 111 is transferred to the electronic image shake correction control unit 123, and finally the electronic image shake correction amount setting unit 306 sets the correction amount.

The first to third communications are performed in each frame, and the camera system control unit 124 reports the base point by the first communication 401 to the lens system control unit 111. The camera system control unit 124 reports the relative time from the base point and the movable range of the electronic image shake correction by the second communication 402. By the third communication 403, the camera system control unit 124 obtains the electronic image shake correction amount from the lens system control unit 111. In contrast, the lens system control unit 111 obtains the base point by the first communication 401 in each frame, obtains the relative time 407 from the base point and the movable range of the electronic image shake correction by the second communication, and distributes the electronic image shake correction amount at the exposure center timing 406. The lens system control unit 111 reports the distributed electronic image shake correction amount to the camera system control unit 124 by the third communication 403.

Figure 5:
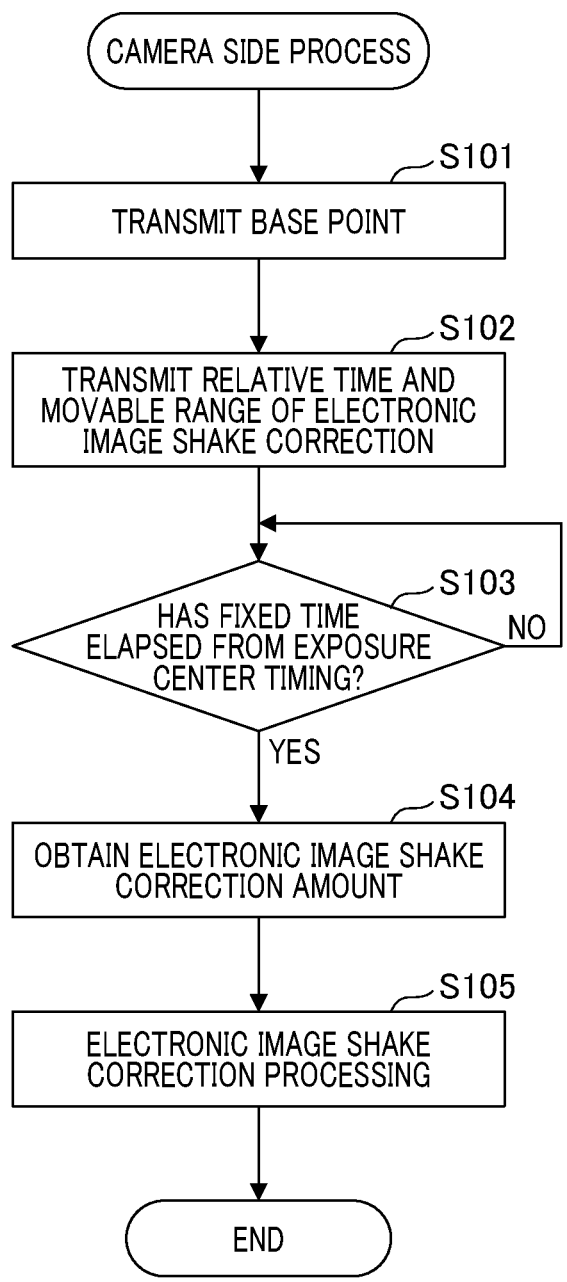
FIG. 5 is a flowchart that explains the communication and control of a camera body in the first embodiment.
Figure 6:
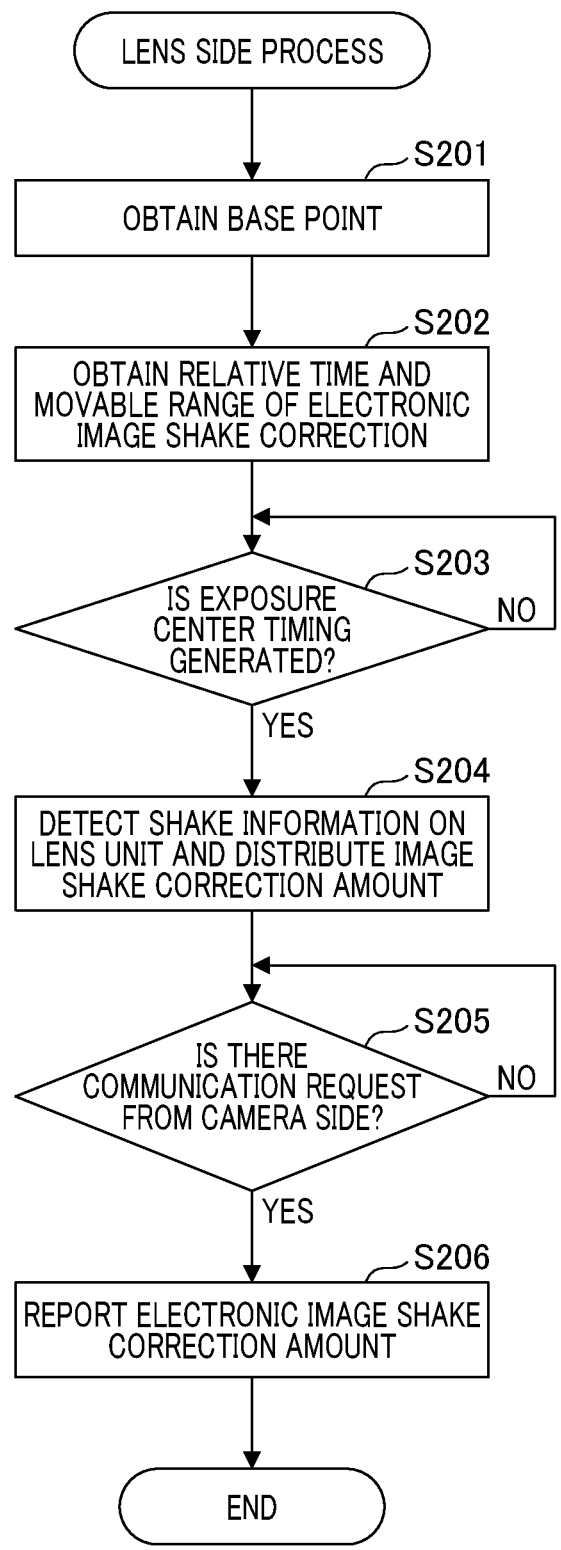
FIG. 6 is a flowchart that explains the communication and control of the lens unit in the first embodiment.

A description will be given of the process of the present embodiment with reference to FIGS. 5 and 6. FIG. 5 is a flowchart relating to the communication and a control content performed by the camera system control unit 124. FIG. 6 is a flowchart relating to the communication and the control content performed by the lens system control unit 111. The following processes are realized in accordance with a predetermined program that is read out from the memory by the CPU of each control unit and executed.

The principal unit of the process shown in FIG. 5 is the camera system control unit 124, and the communication processing is executed between the camera system control unit 124 and the lens system control unit 111 via the camera communication control unit 125 and the lens communication control unit 112. In S101, the camera system control unit 124 performs the first communication 401 to the lens system control unit 111. The first communication timing serves as the base point relating to the exposure center timing 406. Next, in S102, the second communication 402 is performed. The exposure center timing 406 is transmitted by the transmission of the relative time 407 from the base point in the first communication 401. Subsequently, the movable range of the electronic image shake correction at the current focal length is transmitted.

In S103, the camera system control unit 124 determines whether or not fixed time has passed from the exposure center timing 406. The fixed time is time that has been preset in advance from the exposure center timing 406. If the fixed time has passed from the exposure center timing 406, the process proceeds to S104, and if not, the process returns to S103 and the process is repeated. The reason for waiting for the lapse of the fixed time in S103 is so that a communication request to the lens system control unit 111 by the camera system control unit 124 will be performed in a state in which the lens system control unit 111 has completed the control process at the exposure center timing 406.

In S104, the camera system control unit 124 performs the third communication and obtains the electronic image shake correction amount that was distributed by the lens system control unit 111 at the exposure center timing 406. In the next S105, the camera system control unit 124 provides an instruction to the electronic image shake correction control unit 123, and the image shake correction operation is performed based on the electronic image shake correction amount that was obtained in S104.

The principal unit of the process shown in FIG. 6 is the lens system control unit 111, and the communication processing is executed between the lens system control unit 111 and the camera system control unit 124 via the lens communication control unit 112 and the camera communication control unit 125. In S201, the lens system control unit 111 accepts the first communication 401. At the first communication timing 404, a process that obtains the timer time in the lens unit is executed, and that time serves as the base point for the calculation of the exposure center timing.

Next, in S202, the lens system control unit 111 accepts the second communication 402, and obtains the relative time 407 from the base point of the first communication timing 404 and the movable range of the electronic image shake correction. Because the lens system control unit 111 has obtained the base point at the first communication timing 404, it receives the relative time 407 in the second communication, and it sets the exposure center timing by the timer setting. Additionally, the lens system control unit 111 obtains the movable range of the electronic image shake correction. The coefficient K used by the dividing unit 205 is calculated, including this movable range and the movable range of the optical image shake correction of the lens unit itself, and the respective correction amounts relating to the optical image shake correction and the electronic image shake correction are set.

In S203, the lens system control unit 111 determines whether or not the exposure center timing by which the timer setting was performed in S202 is generated. If the exposure center timing 406 is generated, the process proceeds to S204, and if the exposure center timing 406 is not generated, the determination processing of S203 is repeated.

In S204, the lens system control unit 111 obtains the shaking information from the lens shake detection unit 110 at the exposure center timing 406, and the dividing unit 205 distributes the total amount of the image shake correction amount to the optical image shake correction amount and to the electronic image shake correction amount in accordance with the value of coefficient K. The lens system control unit 111 temporarily stores the distributed electronic image shake correction amount until a communication request is provided from the camera system control unit 124.

In S205, the lens system control unit 111 determines whether or not there is a communication request for the third communication 403 from the camera system control unit 124. If there is the communication request for the third communication, the process proceeds to S206, and if not, the determination processing of S205 is repeated. In S206, the lens system control unit 111 accepts the third communication and reports the electronic image shake correction amount that was distributed in S204 to the camera system control unit 124. In the present embodiment, the timing information about the exposure period of time is not transferred by one communication, and the base point and the relative time are respectively reported by the first and second communications from the camera body to the lens unit. Thus, even if the communication timing of the second communication varies due to an influence of another communication, the base point by the first communication and the relative time by the second communication are transmitted to the lens unit, and as a result, accurate exposure center timing can be transmitted.

Additionally, even if the first communication overlaps with another communication and the communication is delayed, the relative time by the second communication can be set in consideration of the delay time upon the issue of the first communication. That is, it is possible to report the exposure center timing by the information about the relative time corrected based on the delay time. Therefore, even if the communication timing of the first communication varies, a more accurate exposure center timing can be transmitted from the camera body to the lens unit. The movable range of the electronic image shake correction and the electronic image shake correction amount are reported by using the angle conversion data. The camera system control unit 124 transmits the movable range of the electronic image shake correction to the lens system control unit 111 and obtains the electronic image shake correction amount from the lens system control unit 111. According to the present embodiment, in the interchangeable lens image pickup system, the image shake correction can be performed while avoiding communication timing deviation caused by the overlapping of the communication performed between the lens unit and the body. It is possible to provide the image pickup system that cooperatively controls the optical image shake correction and the electronic image shake correction with a smaller amount of communication and enlarges the image shake correction range, without the user being conscious of the respective lenses and the camera specifications.

Second Embodiment

Next, a second embodiment of the present invention will be described. In the present embodiment, a description will be mainly given of differences with the first embodiment by using reference numerals that have already been used for the components that are the same as those in the first embodiment of the present invention, and omitting their detailed description. Such omission of description is the same in the embodiments to be described below.

In the first embodiment, after the camera system control unit 124 transmits the timing information for the exposure period of time to the lens system control unit 111, the lens system control unit 111 obtains the electronic image shake correction amount that was distributed at the exposure center timing. In the present embodiment, except for the distribution target, the correction of the correction axis direction (roll direction) is performed by using the detection result of the camera shake detection unit 122, and thereby, the image shake correction effect can be further enhanced.

Figure 7:
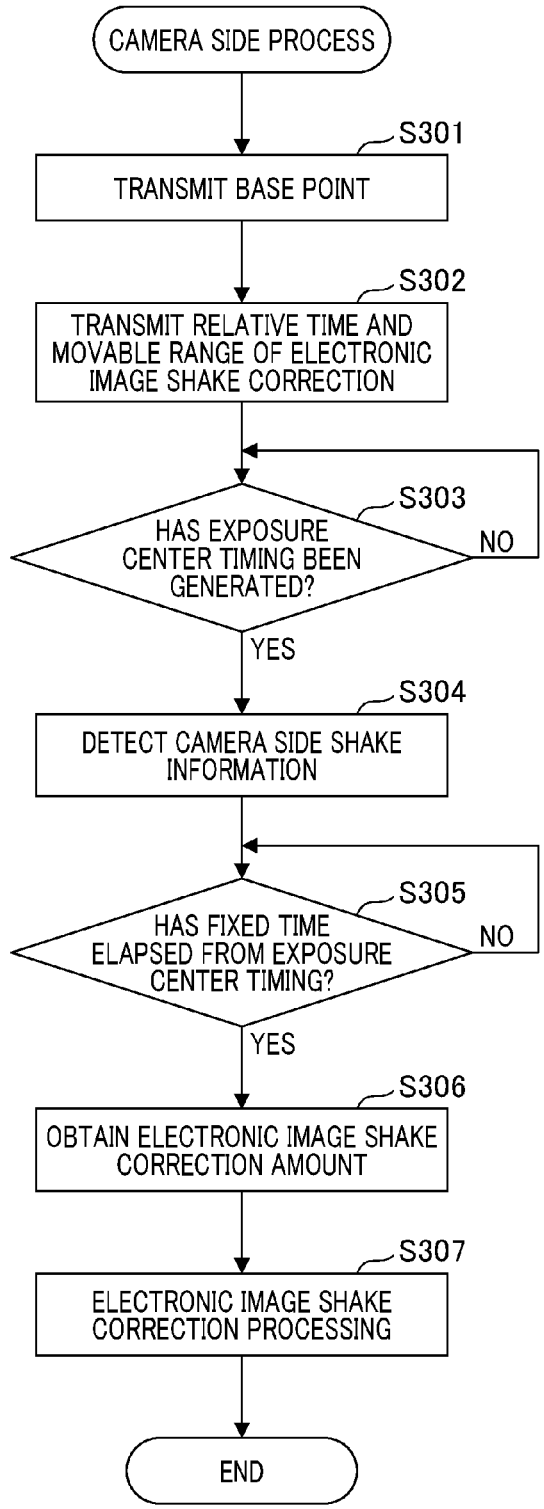
FIG. 7 is a flowchart that explains the communication and control of the camera body in the second embodiment.

A description will be given of the control content of the present embodiment with reference to the flowchart of FIG. 7. FIG. 7 illustrates a control example including the communication processing and the shake detection processing in the camera body. First, in S301, the camera system control unit 124 performs a first communication with the lens system control unit 111 via the camera communication control unit 125. The time for the first communication timing serves as the base point of the exposure center timing. Next, in S302, the camera system control unit 124 performs a second communication via the camera communication control unit 125. A process is executed in which the first communication serves as the base point, the relative time from the base point is transmitted and the exposure center timing is transferred, and the movable range of the electronic image shake correction at the current focal length is transmitted.

In S303, the camera system control unit 124 determines whether or not the exposure center timing is generated by the timer setting. If it determines that the exposure center timing is generated, the process proceeds to S304, and if it determines that the exposure center timing has not been generated, the determination process of S303 is repeated. In S304, the camera system control unit 124 obtains the shaking information on the camera body detected by the camera shake detection unit 122 at the exposure center timing. The shaking information detected here is shaking information on a correction axis that is different from the correction axis relating to the electronic image shake correction amount obtained from the lens system control unit 111 in S306 to be described below, that is, the detection information on a sensor having a different detection direction.

In S305, the camera system control unit 124 determines whether or not the fixed time has passed from the exposure center timing. If it is determined that the fixed time has elapsed from the exposure center timing, the process proceeds to S306, and if not, the determination process of S305 is repeated. The reason for waiting for the lapse of the fixed time in S305 is as described in S103 in FIG. 5. In S306, the camera system control unit 124 performs a third communication with the lens system control unit 111 via the camera communication control unit 125. The camera system control unit 124 obtains the electronic image shake correction amount that has been distributed at the exposure center timing by the lens system control unit 111. In S307, the camera system control unit 124 provides the electronic image shake correction control unit 123 with an instruction to perform the image shake correction control. The electronic image shake correction control unit 123 performs the image shake correction based on the shaking information on the camera body that was detected in S304 and the electronic image shake correction amount that was obtained in S306.

In the present embodiment, the image shake correction control is performed by obtaining the electronic image shake correction amount distributed by the lens system control unit 111 and the shaking information on the camera body. The electronic image shake correction amount is a correction amount relating to the pitch direction and the yaw direction, and the shaking information on the camera body is shake detection information in the correction axis direction (roll direction), which is not the distribution target. Accordingly, the electronic image shake correction in the three axial directions is performed, and as a result, the image shake correction effect can be further enhanced.

Third Embodiment

Next, a third embodiment of the present invention will be described. In the first embodiment, the camera system control unit 124 transmits the exposure center timing and the movable range of the electronic image shake correction to the lens system control unit 111. The lens system control unit 111 transmits the electronic image shake correction amount that has been distributed to the camera system control unit 124. In the present embodiment, the lens system control unit 111 simultaneously transmits the position information for the optical image shake correction to the camera system control unit 124 at the transmission timing of the electronic image shake correction amount. Accordingly, the setting of the correction center of the electronic image shake correction, the tilt and shift correction and the like can be performed, and as a result, the image shake correction effect can further be enhanced.

Figure 8:
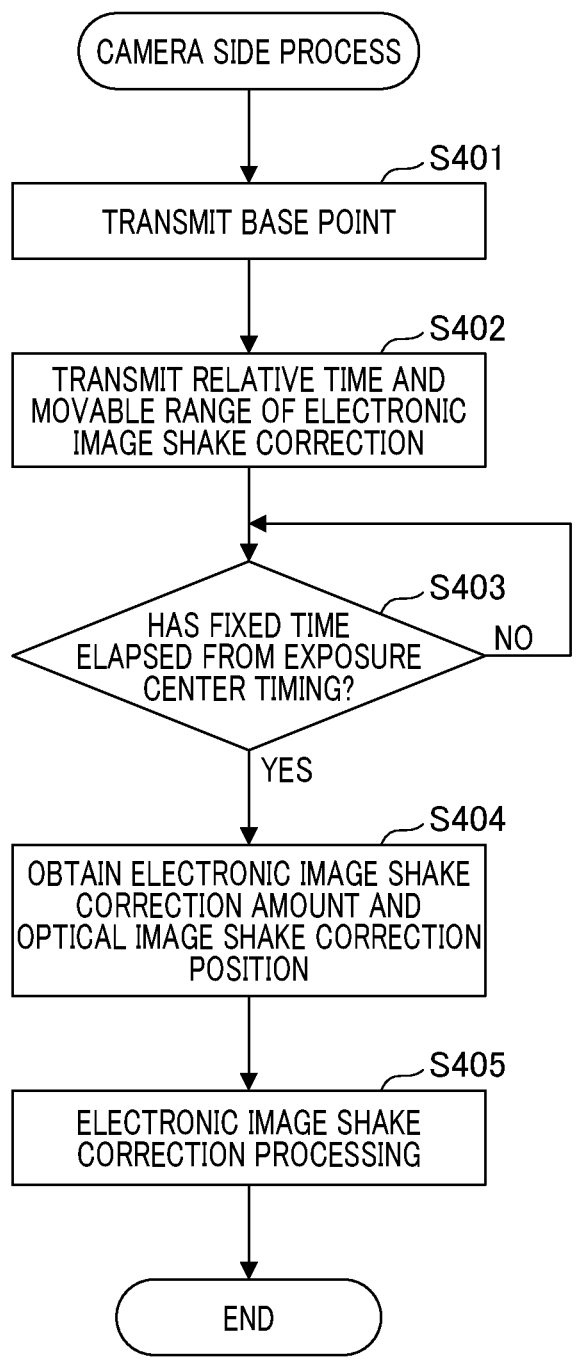
FIG. 8 is a flowchart that explains the communication and control of the camera body in the third embodiment.

With reference to the flowchart in FIG. 8, the control content of the present embodiment will be described. Because each process from S401 to S403 is similar to that from S101 to S103 in FIG. 5, the description thereof will be omitted. A description will be given of S404 and S405.

In S404, the camera system control unit 124 performs the third communication to the lens system control unit 111. The camera system control unit 124 obtains the electronic image shake correction amount that has been distributed at the exposure center timing by the lens system control unit 111 and the position information on the image shake correction unit 105 at the exposure center timing. In the next S405, the camera system control unit 124 provides the electronic image shake correction control unit 123 with an instruction to perform the image shake correction based on the electronic image shake correction amount and the position information for the image shake correction unit 105 obtained in S404. The use of the position information on the image shake correction unit 105 enables matching the setting of the correction center of the electronic image shake correction with respect to the center of the optical axis, whereby more accurate correction is possible. Additionally, the optical image shake correction amount can be understood from the position information on the image shake correction unit 105. Therefore, the effect of correcting the image shake can be further enhanced by performing the tilt and shift correction and the like together with the electronic image shake correction amount.

Figure 9:
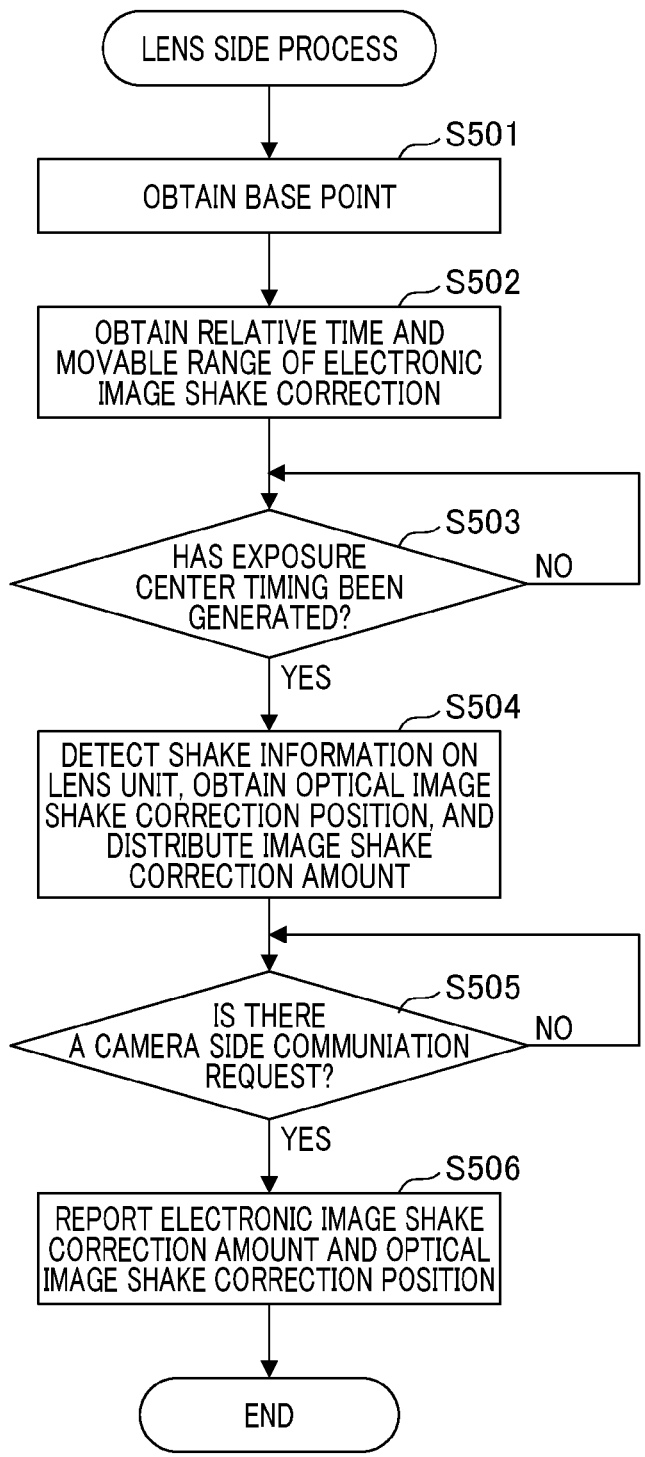
FIG. 9 is a flowchart that explains the communication and control of the lens unit in the third embodiment.

FIG. 9 is a flowchart relating to communication and control content including the correction position of the optical image shake correction of the lens unit. Because each process from S501 to S503 is similar to that from S201 to S203 in FIG. 6, the description will be omitted.

A description will be given of S504 and S506.

In S504, the lens system control unit 111 obtains the shaking information from the lens shake detection unit 110 at the exposure center timing and obtains the position of the image shake correction unit 105 from the position detection unit 209. Additionally, the dividing unit 205 distributes the total amount of the image shake correction amount to the optical image shake correction amount and the electronic image shake correction amount. The lens system control unit 111 temporarily stores the electronic image shake correction amount that has been distributed and the position information on the image shake correction unit 105 that has been detected until a communication request is provided from the camera system control unit 124.

In S505, the lens system control unit 111 determines whether or not there is a communication request for the third communication from the camera system control unit 124 via the lens communication control unit 112. If there is a communication request, the process proceeds to S506, and if there is no communication request, the determination process of S505 is repeated. In S506, the lens system control unit 111 accepts the communication request for the third communication via the lens communication control unit 112 and reports the electronic image shake correction amount distributed in S504 and the position information on the image shake correction unit 105 that has been detected in S504 to the camera system control unit 124.

In the present embodiment, the lens control unit transmits the position information on the optical image shake correction to the camera control unit at the timing of transmitting the electronic image shake correction amount. According to the present embodiment, the setting of the correction center of the electronic image shake correction, the tilt, and shift correction and the like can be performed, and as a result, the image shake correction effect can further be enhanced.

Fourth Embodiment

Next, in the fourth embodiment of the present invention, a description will be given of application to rolling shutter distortion (hereinafter, referred to as "RS distortion") correction, which serves as another type of electronic correction. The exposure method of the image pickup unit 115 has a global shutter system and a rolling shutter system. In an apparatus using the global shutter system represented by a CCD (charge-coupled device) image sensor, the exposure time and the exposure start time between pixels in one frame image are substantially the same. In an apparatus including a CMOS (Complementary Metal Oxide Semiconductor) image sensor, the rolling shutter method is used as the exposure method.

In the rolling shutter system in which the exposure timing differs for each pixel line, image distortion (RS distortion) caused by deviation of the exposure timing and signal read-out time for each line occurs. Shaking of the image pickup apparatus affects the signal reading for each line, and RS distortion occurs. Even if the image pickup apparatus is attached to a tripod or the like, RS distortion occurs if a vibration is applied to the apparatus due to a disturbance such as wind. The RS distortion is distortion that occurs in the shot image because the exposure timing differs for each pixel line, and thereby it is possible to correct the moving amount of each pixel line so as to serve as a correction amount, based on the shake signal of the image pickup apparatus.

Figure 15:
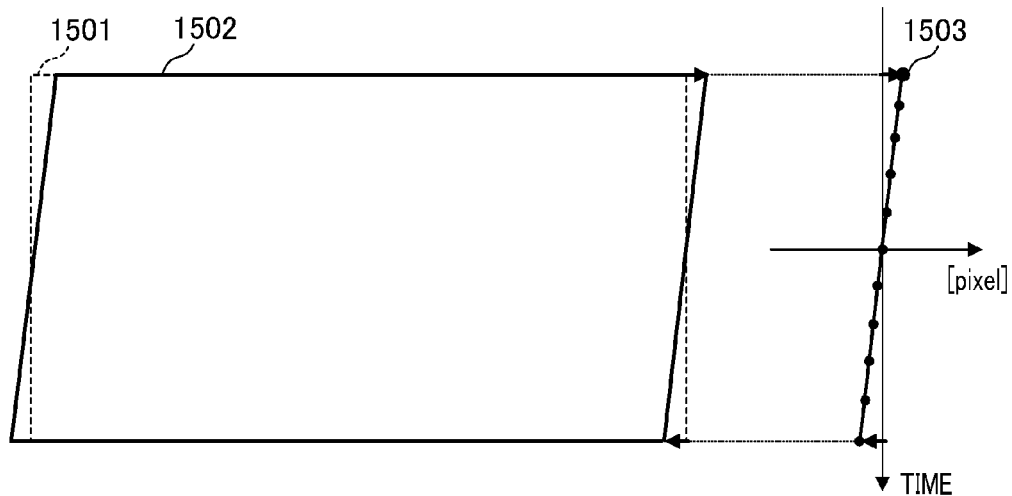
FIG. 15 is a conceptual diagram of rolling shutter distortion correction.

A description will be given of the RS distortion correction with reference to the conceptual diagram of FIG. 15. An image 1501 before the occurrence of the RS distortion (a rectangular frame with a dotted line) and an image 1502 after the occurrence of the RS distortion (a parallelogram frame with a solid line) are illustrated by assuming a case where the image pickup apparatus moves in the horizontal direction. In the diagram on the right side, the moving amount (shake amount) in the horizontal direction of the image pickup apparatus that is generated during the exposure period of time is exemplified by a plurality of points 1503. The horizontal axis represents the pixel position, and the vertical axis corresponds to a time axis. 11 points are shown in the illustrated example.

In the image pickup apparatus, the moving amount (shake amount) in the horizontal direction of the apparatus, which is generated during the exposure period of time, is calculated at a plurality of points. The moving amount of each line is obtained to serve as a correction amount by interpolating between the plurality of points, and the correction processing is performed by changing the read-out position for each line with respect to the shaking in the horizontal direction. That is, the lens shake detection unit 110 (FIG. 2) detects shaking that causes the RS distortion. The video image signal processing unit 117 electronically performs the RS distortion correction. Calculation of the correction amount that corrects the RS distortion is performed by the dividing unit 205 similarly to the case of the electronic image shake correction amount, and the image shake correction amount is multiplied by the coefficient "1−K". The camera communication control unit 125 (FIG. 3) obtains the RS distortion correction amount from the lens unit. The pixel conversion unit 301 converts the electronic image shake correction amount that has been transmitted by angle conversion into a pixel-converted value. The conversion coefficients used at this time have different values for each focal length and are changed each time the focal length changes. Furthermore, the limiter 305 performs clamping in the movable range of the RS distortion correction. Limit values in each correction axis direction are set. The electronic image shake correction amount setting unit 306 sets the RS distortion correction amount in each correction axis direction.

Figure 10:
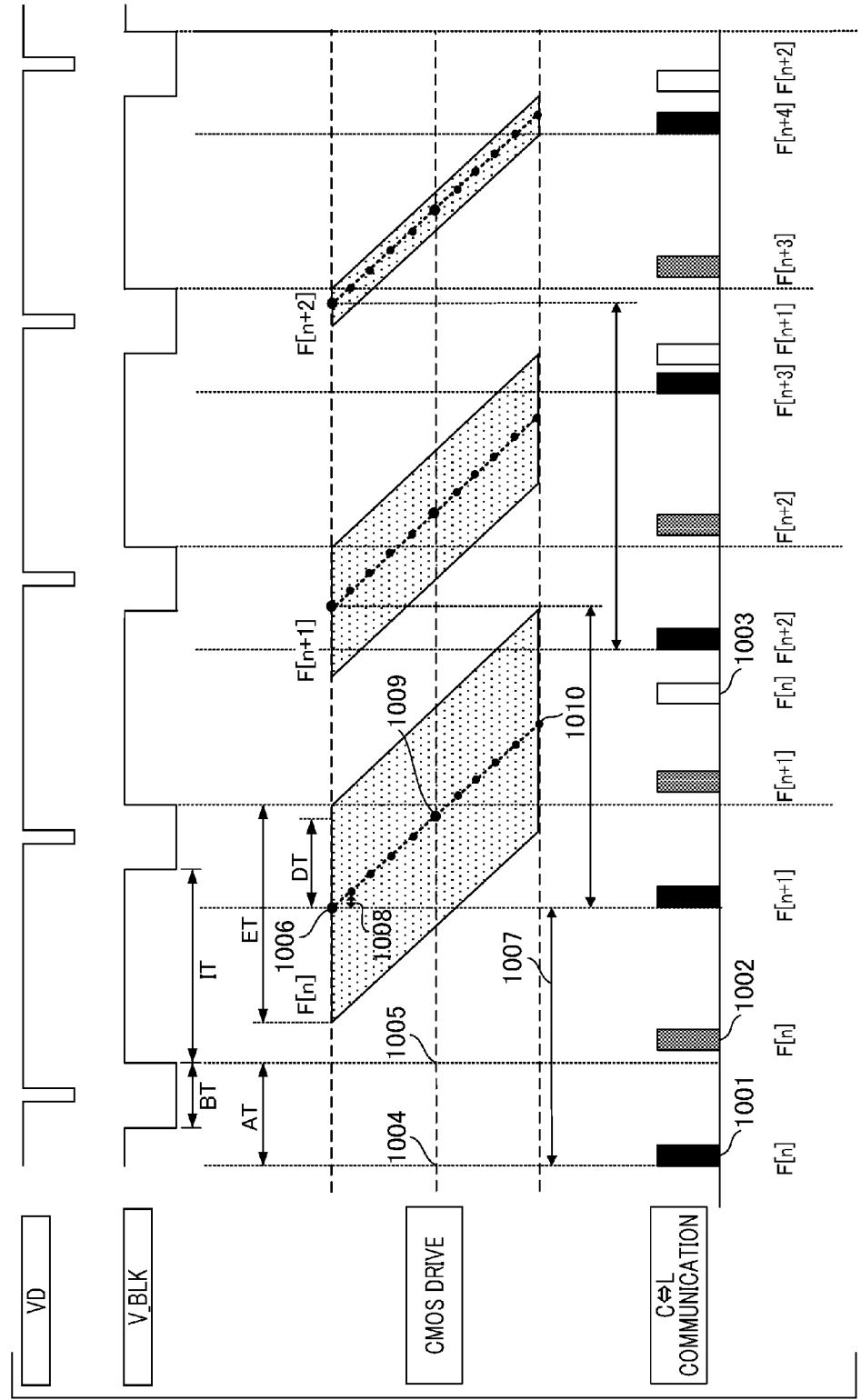
FIG. 10 illustrates communication and the timing thereof in the fourth embodiment.

Next, with reference to FIG. 10, a description will be given of communication relating to the RS distortion correction performed between the lens communication control unit 112 and the camera communication control unit 125, and the timing thereof. VD, V_BLK, and the like are the same as those in FIG. 4. In order to perform the RS distortion correction, it is necessary to transfer an exposure center timing (1009) of the image pickup unit 115 from the camera body to the lens unit. Because there is a plurality of correction points in the RS distortion correction, the difference time between the leading correction timing and the correction point is transmitted. Also, in the present embodiment, in order to avoid deviation in the communication timing, communication is performed twice, once for the base point and once for the relative time. In FIG. 10, a first communication 1001 is shown by communication timing 1004. A second communication 1002 is after timing 1005 by which the exposure time of the corresponding frame that transmits the exposure center is determined. A process that transmits leading correction timing 1006 of the RS distortion correction is executed. The control is performed by the lens system control unit 111 serving as a principal unit, and a communication is performed using angle conversion data for RS distortion correction.

By using a vertical synchronization signal (refer to VD) of the image pickup unit 115 as a starting point, the camera system control unit 124 performs the first communication 1001 to the lens system control unit 111. The time at the first communication timing 1004 becomes the base point for transferring the leading correction timing 1006 of the RS distortion correction from the camera system control unit 124 to the lens system control unit 111. At the timing at which the first communication 1001 has been accepted, the lens system control unit 111 obtains the internal timer time and the time serves as the base point for calculating the leading correction timing of the RS distortion correction. Note that the communication timing 1004 of the first communication 1001 may be the same timing as the vertical synchronization signal or may be before or after any time from the vertical synchronization signal. However, it is assumed that the communication is performed with the fixed time difference with respect to the vertical synchronization signal every frame. Additionally, it is desirable that the first communication timing 1004 does not overlap with another communication. In the example of FIG. 10, the communication timing 1004 of the first communication 1001 is set at the timing before the vertical synchronization signal.

Next, the camera system control unit 124 performs the second communication 1002. In the second communication 1002, a relative time 1007 from the base point is transmitted to the lens system control unit 111, by serving the time by the first communication 1001 as the base point. A difference time 1008 is the difference time between the correction points of the RS distortion correction. The camera system control unit 124 transmits the difference time 1008 between the correction points of the RS distortion correction and the movable range B of the electronic image shake correction at the current focal length to the lens system control unit 111. The second communication 1002 is after the timing 1005 by which the exposure time of the corresponding frame that transmits the leading correction timing 1006 of the RS distortion correction is determined. Thus, even if the exposure time varies in each frame, the accurate leading correction timing 1006 of the RS distortion correction can be transmitted. The leading correction timing 1006 of the RS distortion correction is obtained based on the determined exposure time and the signal read-out time of the image pickup element, and the relative time 1007 is obtained from the difference from the base point by the first communication 1001.

The lens system control unit 111 has already obtained the base point at the timing of the acceptance of the first communication 1001. Accordingly, by obtaining the relative time 1007 by the second communication 1002, the lens system control unit 111 can set the leading correction timing 1006 of the RS distortion correction by the internal timer setting. Additionally, the lens system control unit 111 obtains the movable range B of the electronic image shake correction, and thereby the lens system control unit 111 can calculate the coefficient K used in the dividing unit 205 including the movable range A of the optical image shake correction of the lens unit. The lens system control unit 111 obtains the shaking information from the lens shake detection unit 110 at the leading correction timing 1006 of the RS distortion correction. The dividing unit 205 multiplies the image shake correction amount by the coefficient "1−K" and calculates the RS distortion correction amount. The lens system control unit 111 holds the RS distortion correction amount until a communication request is provided from the camera system control unit 124.

Additionally, the lens system control unit 111 sets the next RS distortion correction timing by the internal timer setting. In the setting of the next RS distortion correction timing, the lens system control unit 111 uses the correction timing of the current RS distortion correction and the difference time 1008 between the correction points of the RS distortion correction. The timer setting is repeatedly performed until the total correction timing of the RS distortion correction ends. In FIG. 10, because there are 11 correction points of the RS distortion correction, the sixth correction point from the leading correction timing 1006 corresponds to the exposure center. That is, the timing information for the exposure period of time includes the information on the exposure center timing 1009. Also at the exposure center timing 1009, the lens system control unit 111 has obtained the electronic image shake correction amount.

Finally, the camera system control unit 124 performs a third communication 1003 to the lens system control unit 111. In the third communication 1003, the lens system control unit 111 accepts a communication request from the camera system control unit 124 and transfers the RS distortion correction amount being held. The communication timing of the third communication 1003 is after a final correction timing 1010 of the RS distortion correction. The final correction timing 1010 corresponds to the eleventh correction point. Because the camera system control unit 124 has originally grasped the RS distortion correction timing, a communication is performed at any timing after the final correction timing 1010 of the RS distortion correction. The camera system control unit 124 transmits the RS distortion correction amount obtained from the lens system control unit 111 to the electronic image shake correction control unit 123 and finally sets it to the electronic image shake correction amount setting unit 306.

The first to third communications are performed every frame, the camera system control unit 124 reports the base point in the first communication 1001, and it reports the relative time from the base point and the movable range of the electronic image shake correction in the second communication 1002, and receives the RS distortion correction amount in the third communication 1003. The lens system control unit 111 obtains the base point by the first communication 1001, and obtains the leading correction timing of the RS distortion correction based on the relative time from the base point and the movable range of the electronic image shake correction by the second communication 1002. The lens system control unit 111 calculates the correction amount at each RS distortion correction timing and reports the result to the camera system control unit 124 in the third communication 1003.

Figure 11:
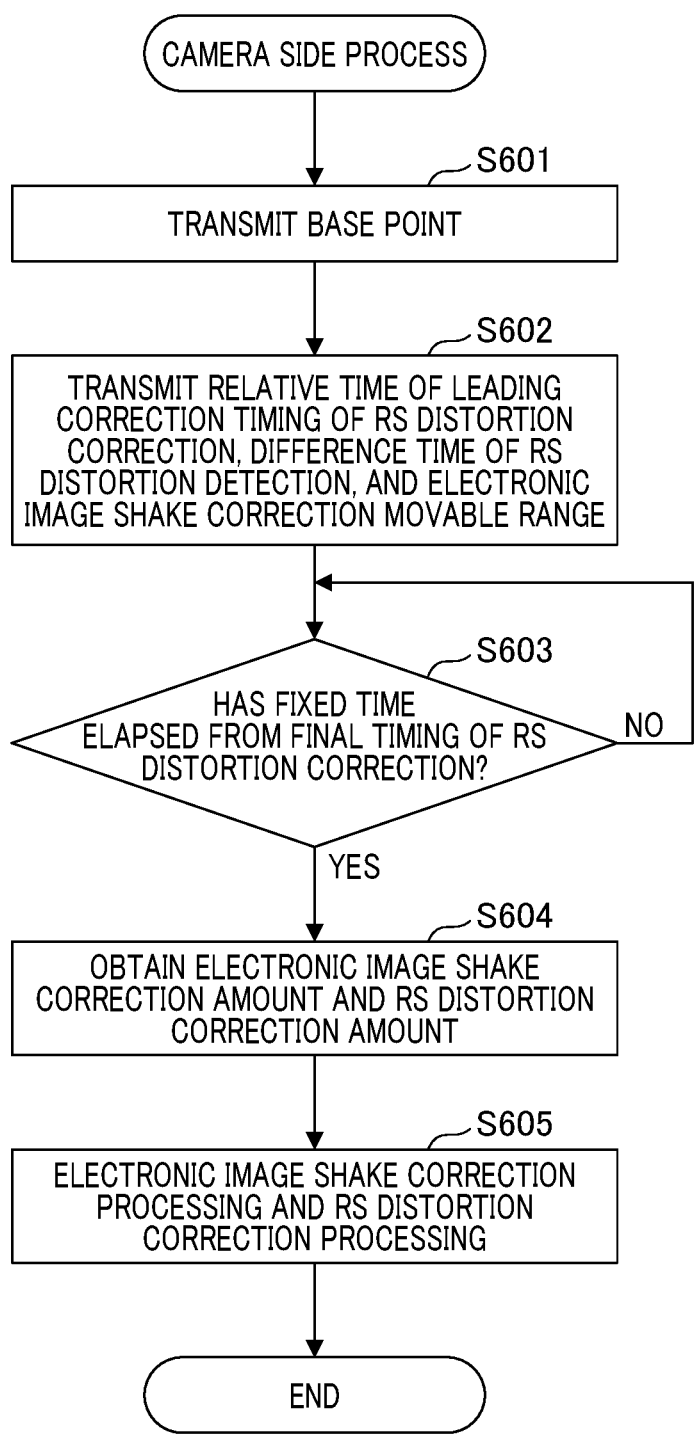
FIG. 11 is a flowchart that explains a communication and control of the camera body in the fourth embodiment.

A description will be given of a communication and a control content including the RS distortion correction performed by the camera system control unit 124, with reference to the flowchart of FIG. 11. First, in S601, the camera system control unit 124 performs the first communication to the lens system control unit 111 via the camera communication control unit 125. The time according to the first communication serves as the base point for the leading correction timing 1006 of the RS distortion correction. Next, in S602, the camera system control unit 124 performs the second communication to the lens system control unit 111 via the camera communication control unit 125. The relative time 1007 from the base point is transmitted using the time according to the first communication to serves as the base point, and the leading correction timing 1006 of the RS distortion correction is transmitted to the lens system control unit 111. The camera system control unit 124 transmits the difference time between the correction points of the RS distortion correction and the movable range of the electronic image shake correction at the current focal length to the lens system control unit 111.

In S603, the camera system control unit 124 determines whether or not the fixed time has elapsed from the final correction timing 1010 of the RS distortion correction. The fixed time is time that has been set in advance. If the fixed time has elapsed from the final correction timing 1010 of the RS distortion correction, the process proceeds to S604, and if the fixed time has not elapsed, the determination process of S603 is repeated. The reason for waiting for the lapse of a fixed time in S603 is for performing a communication request to the lens system control unit 111 by the camera system control unit 124 in a state in which the lens system control unit 111 has completed the process for the final correction point of the RS distortion correction.

In S604, the camera system control unit 124 performs the third communication to the lens system control unit 111 via the camera communication control unit 125. The camera system control unit 124 obtains the electronic image shake correction amount distributed by the lens system control unit 111 at the exposure center timing 1009 and the RS distortion correction amount at each of the plurality of correction points of the RS distortion correction. In S605, the camera system control unit 124 provides an instruction to the electronic image shake correction control unit 123 so as to perform image correction based on the electronic image shake correction amount and the RS distortion correction amount obtained in S604.

Figure 12:
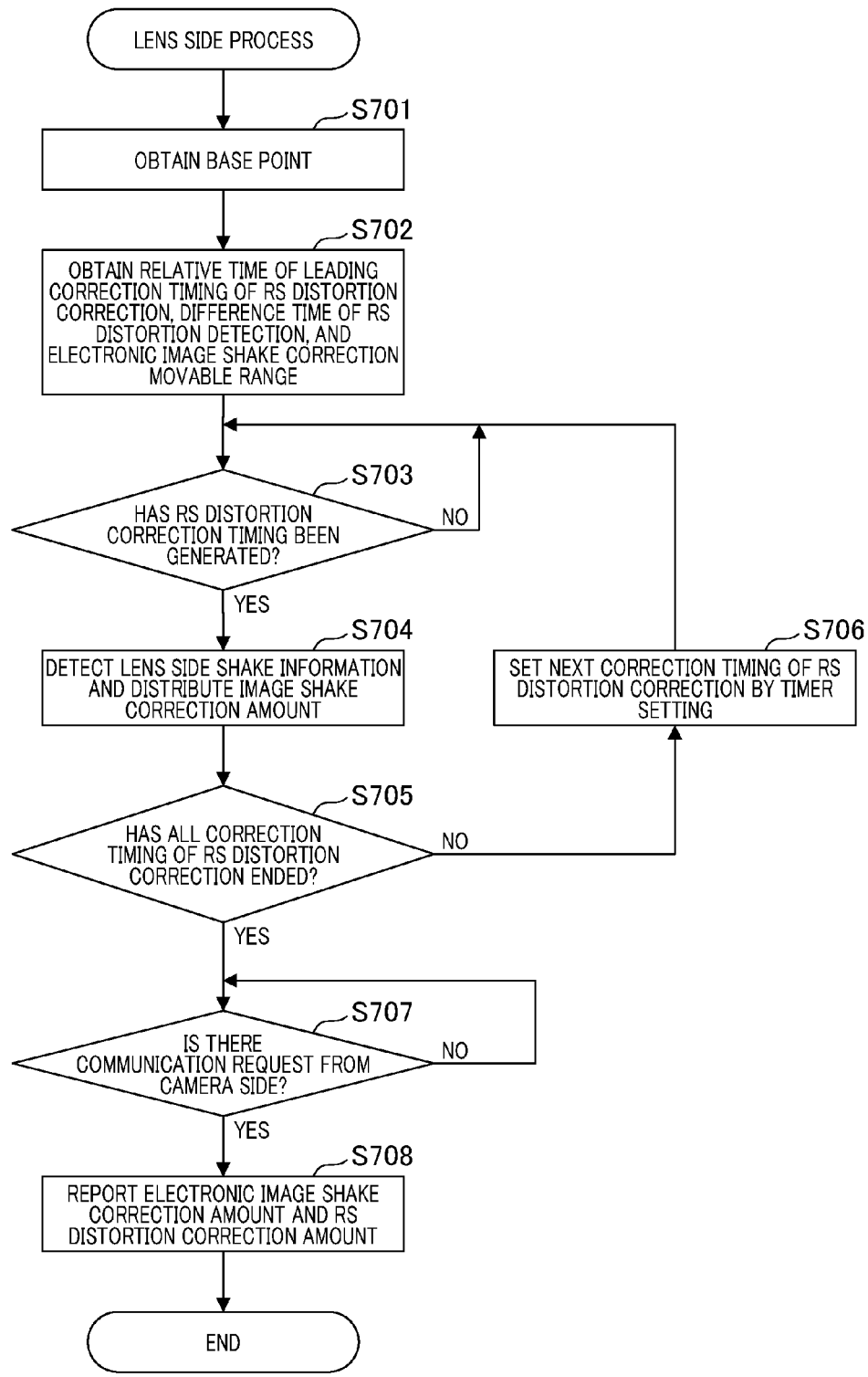
FIG. 12 is a flowchart illustrating the communication and control of the lens unit in the fourth embodiment.

A description will be given of a communication and a control content including the RS distortion correction performed by the lens system control unit 111, with reference to a flowchart in FIG. 12. First, in S701, the lens system control unit 111 accepts the first communication from the camera system control unit 124 via the lens communication control unit 112. The lens system control unit 111 obtains the internal timer time at the first communication timing, and the time serves as the base point for the calculation of the leading correction timing of the RS distortion correction.

Next, in S702, the lens system control unit 111 accepts the second communication from the camera system control unit 124 via the lens communication control unit 112. The lens system control unit 111 obtains the relative time from the base point, the difference time between the correction points of the RS distortion correction, and the movable range of the electronic image shake correction. Because the lens system control unit 111 has obtained the time of the first communication timing 1004 to serve as the base point, it receives the relative time 1007 by the second communication 1002, and sets the leading correction timing of the RS distortion correction by the internal timer setting. Additionally, the lens system control unit 111 receives the movable range of the electronic image shake correction, and calculates and sets the coefficient K used in the dividing unit 205, including the movable range of the optical image shake correction of the lens unit.

In S703, the lens system control unit 111 determines whether or not the correction timing of the RS distortion correction has been generated. If the lens system control unit 111 determines that the correction timing of the RS distortion correction has been generated, the process proceeds to S704, and if it determines the correction timing of the RS distortion correction has not been generated, the determination process of S703 is repeated. In S704, the lens system control unit 111 obtains the shaking information from the lens shake detection unit 110 at the correction timing of RS distortion correction. Additionally, the dividing unit 205 calculates the optical image shake correction amount of the lens unit and the correction amount of the RS distortion correction. The lens system control unit 111 temporarily stores the RS distortion correction amount until a communication request is provided from the camera system control unit 124. Note that if there are 11 correction points of the RS distortion correction, the sixth correction point from the leading corresponds to the exposure center. The lens system control unit 111 obtains the electronic image shake correction amount even at the exposure center timing 1009.

In S705, the lens system control unit 111 determines whether or not all of the correction timings of the RS distortion correction have been generated. If all of the correction timings of the RS distortion correction have been generated, the process proceeds to S707, and if all of the correction timings of the RS distortion correction have not been generated, the process proceeds to S706. In S706, the lens system control unit 111 sets the next correction timing of the RS distortion correction by the internal timer setting. In the setting of the next correction timing, the lens system control unit 111 uses the current correction timing of the RS distortion and the difference time between the correction points of the RS distortion correction obtained in S702. After the timer setting, the process returns to S703.

In S707, the lens system control unit 111 determines whether or not a communication request for the third communication is provided from the camera system control unit 124 via the lens communication control unit 112. If the communication request for the third communication has been provided, the process proceeds to S708, and if no communication request has been provided, the determination processing of S707 is repeated. In S708, the lens system control unit 111 accepts the third communication from the camera system control unit 124 via the lens communication control unit 112. The lens system control unit 111 reports the electronic image shake correction amount distributed at the exposure center timing and the RS distortion correction amount at each of the plurality of correction points of the RS distortion correction to the camera system control unit 124.

In the present embodiment, the leading correction timing of the RS correction distortion correction and the difference time between the correction points of the RS distortion correction are transmitted from the camera system control unit 124 to the lens system control unit 111. The lens system control unit 111 grasps the timing of each correction point of the RS distortion correction and can obtain the RS distortion correction amount. The RS distortion correction amount is reported to the camera control unit, and the RS distortion correction is performed. According to the present embodiment, in an interchangeable lens image pickup system, it is possible to correct distortion of an image by avoiding communication timing deviation due to the overlapping of communication.

The present embodiment described a case in which the camera control performs correction by using the RS distortion correction amount obtained from the lens control unit. Performing the RS distortion correction in the direction of correction axis (roll direction) other than the axis obtained by the camera control unit enables further enhancing the image shake correction effect. Additionally, in the present embodiment, 11 points are shown in the illustrated example, serving as the RS distortion correction points. It is not necessary to fix the number of the RS distortion correction points to a predetermined number, and, for example, the number of correction points may be changed in response to a communication speed that can be handled by the lens unit. In this case, the camera control unit obtains a compatible communication speed by communication with the lens unit, and reports the number of correction points of the RS distortion correction to the lens control unit during the second communication. In accordance with this, the number of correction points of the RS distortion correction to be obtained by the lens control section is determined.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-035020, filed Feb. 26 2016, which is hereby incorporated by reference wherein in its entirety.

What is claimed is:

1. An image pickup apparatus that performs communication with a lens unit detachably mounted on the image pickup apparatus, the image pickup apparatus comprising:
   an image pickup unit; and
   at least one of a processor and circuitry which function as:
   a second communication unit that is configured to communicate with the lens unit; and
   a determination unit that is configured to determine a relative time,
   wherein, in a first communication, the second communication unit transmits information indicating a base point timing to the lens unit,
   wherein, in a second communication, the second communication unit transmits information indicating the relative time determined by the determination unit to the lens unit;
   wherein the determination unit determines a difference between an exposure timing of the image pickup unit and the base point timing indicated by the information which has been transmitted in the first communication as the relative time; and
   wherein the relative time changes at least by the length of the exposure time.

2. The image pickup apparatus according to claim 1, wherein the information indicating the base point timing is information in which timing of a vertical synchronization signal serves as a start point.

3. The image pickup apparatus according to claim 1, wherein the relative time indicates a time length from the base point timing to an exposure center of the image pickup unit.

4. The image pickup apparatus according to claim 1,
wherein the at least one of the processor and the circuitry further functions as:
an image shake correction unit that is configured to correct an image shake of an image; and
a control unit that is configured to control the image shake correction unit.

5. The image pickup apparatus according to claim 4,
wherein, in a third communication, the second communication unit receives information relating to an image shake correction amount from the lens unit and reports the amount to the control unit, and
wherein the control unit controls the image shake correction unit in accordance with the image shake correction amount.

6. The image pickup apparatus according to claim 1,
wherein the at least one of the processor and the circuitry further functions as:
a correction unit that is configured to correct distortion of an image; and
a control unit that is configured to control the correction unit.

7. The image pickup apparatus according to claim 6,
wherein the second communication unit transmits information on leading correction timing, which serves as the relative time, to the lens unit.

8. The image pickup apparatus according to claim 7,
wherein if the control unit performs control that corrects the distortion of the image with a plurality of correction points at different timings, the second communication unit transmits information on a difference time between the correction points in the second communication, to the lens unit.

9. The image pickup apparatus according to claim 1,
wherein the determination unit determines the relative time by using a delay time of transmitting the information indicating the base point timing in the first communication; and
wherein the delay time is a time period between a target time and actual occurrence time of the first communication.

10. The image pickup apparatus according to claim 1,
wherein the second communication is performed after a determination of the length of the exposure timing of the image pickup unit.

11. The image pickup apparatus according to claim 1,
wherein the at least one of the processor and the circuitry further functions as a setting unit that is configured to set the exposure timing of the image pickup unit based on the length of an exposure time.

12. The image pickup apparatus according to claim 1,
wherein the relative time transmitted in the second communication starts from the base point timing transmitted in the first communication.

13. A lens unit that detachably mounted on an image pickup apparatus comprising:
an image shake correction lens that is configured to correct an image shake in an image due to shaking; and
at least one of a processor and circuitry which function as:
a first communication unit that is configured to communicate with the image pickup apparatus; and
a control unit that is configured to control the image shake correction lens,
wherein, in a first communication, the first communication unit receives information indicating a base point timing from the image pickup apparatus,
wherein the first communication is performed repeatedly; and
wherein, in a second communication, the first communication unit receives information indicating a relative time from the image pickup apparatus,
wherein the control unit obtains correction information for an image shake correction based on a timing and controls the image shake correction lens based on the correction information, and
wherein the timing is determined by a first base point timing, which is indicated by information received by one of a plurality of the first communication, and the relative time received in the second communication performed after the receiving the information indicating the first base point timing.

14. The lens unit according to claim 13,
wherein the information indicating the base point timing is information in which timing of a vertical synchronization signal serves as a start point.

15. The lens unit according to claim 13,
wherein the relative time indicates a time length from the base point timing to an exposure center of the image pickup apparatus, and
wherein the first communication unit receives the information indicating the relative time after the determination of an exposure period of time.

16. The lens unit according to claim 13,
wherein the control unit obtains a correction information for an image shake correction performed in the image pickup apparatus, and, performs control such that the first communication unit transmits the correction information to the image pickup apparatus in a third communication.

17. The lens unit according to claim 13,
wherein the control unit obtains a correction amount of a correction unit that corrects distortion of an image included in the image pickup apparatus, and, in a third communication, performs control in which the first communication unit transmits the correction amount to the image pickup apparatus.

18. The lens unit according to claim 17,
wherein, if the control unit performs control that corrects distortion of an image with a plurality of correction points at different timings, the first communication unit receives information on a difference time between the correction points in the second communication from the image pickup apparatus and obtains a correction amount of the distortion of the image at the correction point.

19. The lens unit according to claim 18,
wherein, in the third communication, the control unit performs control in which the first communication unit transmits the correction amount to the image pickup apparatus.

20. The lens unit according to claim 13, wherein the control unit performs control of an image shake correction by driving of the image shake correction lens.

21. The lens unit according to claim 13,
wherein the control unit detects a shake at a timing determined by the base point timing and the relative time and obtains the correction information in accordance with the detected shake.

22. The lens unit according to claim 13, wherein the timing is a timing at which the relative time passed after receiving the information indicating the first base point timing.

23. The lens unit according to claim 13, wherein the relative time is a time length from the base point timing to an exposure timing of the image pickup apparatus.

24. The lens unit according to claim 13,
wherein the first communication is performed repeatedly, and
wherein the second communication is performed between repeated the first communication.

25. An image pickup system including a body of an image pickup apparatus and a lens unit, the image pickup system comprising:
an image pickup unit; and
at least one of a processor and circuitry which function as:
a first communication unit that is configured to communicate with a second communication unit which is included in the body;
a correction unit that is configured to correct an image shake in an image due to shaking;
a control unit that is configured to obtain a shake detection signal and control the correction unit, the second communication unit that is configured to communicate with the first communication unit which is included in the lens unit; and
a determination unit that is configured to determine a relative time,
wherein, in a first communication, the second communication unit transmits information indicating a base point timing to the first communication unit,
wherein, in a second communication, the second communication unit transmits information indicating the relative time determined by the determination unit to the first communication unit;
wherein the determination unit determines a difference between an exposure timing of the image pickup unit and the base point timing indicated by the information which has been transmitted in the first communication as the relative time; and
wherein the relative time changes at least by the length of the exposure time.

26. A control method executed in an image pickup system including a lens unit and a body of an image pickup apparatus, the control method of the image pickup system comprising:
a process in which, in a first communication, a second communication unit included in the body transmits information indicating a base point timing to a first communication unit included in the lens unit, and
a process in which, a determination unit that is configured to determine a relative time,
a process in which, in a second communication, the second communication unit transmits information on the relative time determined by the determination unit from a base point timing to the first communication unit;
wherein the determination unit determines a difference between an exposure timing of an image pickup unit included in the image pickup apparatus and the base point timing indicated by the information which has been transmitted in the first communication as the relative time; and wherein the relative time changes at least by the length of the exposure time.

27. An image pickup apparatus that performs communication with a lens unit detachably mounted on the image pickup apparatus, the image pickup apparatus comprising:
an image pickup unit; and
at least one of a processor and circuitry which function as:
a second communication unit that is configured to communicate with the lens unit,
an image shake correction unit that is configured to correct an image shake of an image;
a control unit that is configured to control the image shake correction unit, and
a determination unit that is configured to determine a difference between an exposure center of the image pickup unit and a base point timing as a relative time,
wherein in a first communication, the second communication unit transmits information indicating a base point timing to the lens unit, and
wherein, in a second communication, the second communication unit transmits information indicating the relative time.

28. The image pickup apparatus according to claim 27, wherein in a third communication, the second communication unit receives information which is based on the base point timing and the relative time from the lens unit.

29. The image pickup apparatus according to claim 28,
wherein the information based on the base point timing and the relative time is obtained by the lens unit after timing determined based on the information on the base point timing and the information on the relative time.

30. A lens unit that is detachably mounted on an image pickup apparatus comprising:
an image shake correction lens that is configured to correct an image shake in an image due to shaking; and
at least one of a processor and a circuitry which function as:
a first communication unit that is configured to communicate with the image pickup apparatus; and
a control unit that is configured to obtain a shake detection signal and control the image shake correction lens,
wherein, in a first communication, the first communication unit receives information indicating a base point timing from the image pickup apparatus, and
wherein, in a second communication, the first communication unit receives information indicating a relative time which is a time length from the base point timing to an exposure center of the image pickup unit, from the image pickup apparatus,
wherein the control unit obtains a timing determined by the base point timing and the relative time, and obtains the shake detection signal at the timing.

31. The lens unit according to claim 24, wherein in a third communication, the first communication unit transmits a correction information of an image shake correction which is obtained based on the base point timing and the relative time to the image pickup apparatus.

32. The lens unit according to claim 31,
wherein the third communication is performed after obtaining a shake detection signal.

* * * * *